United States Patent [19]
Horiike et al.

[11] Patent Number: 6,044,115
[45] Date of Patent: Mar. 28, 2000

[54] METHOD AND APPARATUS FOR CODING AND DECODING DIGITAL IMAGE DATA USING IMAGE QUANTIZATION MODIFICATION

[75] Inventors: Kazuyoshi Horiike, Kyoutoshi; Noboru Mizuguchi, Oosakashi, both of Japan

[73] Assignee: Matsushita Electric Industrial Co., Ltd., Japan

[21] Appl. No.: 08/987,243

[22] Filed: Dec. 9, 1997

[30] Foreign Application Priority Data

Dec. 13, 1996 [JP] Japan ................................. 8-333579

[51] Int. Cl.[7] ................................................ H04N 7/32

[52] U.S. Cl. .......................... 375/240; 348/405; 348/419

[58] Field of Search .................................... 348/404–405, 348/415–416, 419; 386/109, 111–112, 27, 33; 382/239, 251, 236, 238

[56] References Cited

U.S. PATENT DOCUMENTS

| | | | |
|---|---|---|---|
| 5,089,889 | 2/1992 | Sugiyama | 348/405 |
| 5,598,213 | 1/1997 | Chung et al. | 348/405 |
| 5,686,962 | 11/1997 | Chung et al. | 348/402 |
| 5,691,770 | 11/1997 | Keesman et al. | 348/405 |
| 5,748,249 | 5/1998 | Fujiwara | 348/419 |
| 5,790,745 | 8/1998 | Sugiyama et al. | 386/111 |

FOREIGN PATENT DOCUMENTS 2-248180 10/1990 Japan ............................ H04N 7/13

*Primary Examiner*—Vu Le
*Attorney, Agent, or Firm*—Parkhurst & Wendel, L.L.P.

[57] ABSTRACT

An image coding method and apparatus for transforming and quantizing an image to produce transformed and quantized coefficients. The coefficients are coded and a complexity index value is obtained from the input image to calculate local characteristic values used to modify the quantization scale. In this manner, rate control is obtained on the basis of the local characteristics of the image, whereby the quality of the coded image and the precision of the rate control is improved.

20 Claims, 9 Drawing Sheets

METHOD AND APPARATUS FOR CODING AND DECODING DIGITAL IMAGE DATA USING IMAGE QUANTIZATION MODIFICATION

FIELD OF THE INVENTION

The present invention relates to apparatuses and methods for coding image, apparatuses and methods for decoding image, coded image recording media, and coded image transmitting methods. More particularly, the invention relates to image coding employed when a digital image is compressed for transmission and recording.

BACKGROUND OF THE INVENTION

With the development of digital technology in recent years, the transfer rate for digitizing an image and outputting it as digital image data reaches several hundreds of megabits/sec~several gigabits/sec. When transmitting or recording the digital image data, the transmission is restricted by the communication cost and the recording is restricted by the recording capacity. So, there are proposed a coding technique of compressing digital image data to obtain coded image data and a decoding technique of decompressing the coded image data to obtain the original image, whereby compressed digital data are transmitted and recorded.

FIG. 8 is a diagram for explaining the compressive coding and the decompressive decoding. As shown in FIG. 8, generally, image data, that is, an array of digitized pixels, is divided into blocks each having a prescribed size (8×8 pixels in FIG. 8). Each pixel has a pixel value relating to its color and luminance. In this stage, however, the pixel values are in the random state as the original image. When these pixels are subjected to transform such as DCT (Discrete Cosine Transform), pixels of large pixel values are biased as shown in the figure. So, by quantization, each term is arithmetically divided by a prescribed number and terms of less contribution are treated as 0, thereby compressing the image data. Thereafter, variable-length code conversion is sometimes carried out. As shown in FIG. 8, when the coded data is transmitted and received, the coded data is restored to the original image in a decoding process comprising inverse quantization, i.e., inverse arithmetic of the above-mentioned quantization, and inverse transform, i.e., inverse arithmetic of the above-mentioned transform, whereby an image approximately equal to the original image is obtained.

Further, variable-length coding, such as run-length coding, enables further compression of data. For example, in run-length coding, data compression is achieved as follows. That is, the number of continuous pixels having the same pixel values is coded as a 2-byte code (run) and the pixel value is coded as a 1-byte code (length). Hereinafter, a notation like [00] means 1 byte in hexadecimal numeral.

For example, assuming that an array of pixel values, [00][00][00][01][01][02][02][02][02][02], is given, this is coded as follows. Since three pieces of [00] continue from the head of the array, 2-byte data [00][03] showing 'three pieces' and 1-byte data [00] showing the pixel value are given. Subsequently, since two pieces of [01] continue, 2-byte data [00][02] showing 'two pieces' and 1-byte data [01] showing the pixel value are given. Finally, for subsequent five pieces of [02], 2-byte data [00][05] showing 'five pieces' and 1-byte data [02] showing the pixel value are given. These data are arranged as [00][03][00][00][02][01][00][05][02], resulting in coded data compressed by 10%. As the number of continuous pixels of the same pixel value increases, the compression ratio increases.

Furthermore, coding is generally carried out on the basis of the spatial or temporal local correlation possessed by image, and this coding is called "local coding". There are two kinds of local coding processes: intra-frame coding that eliminates redundancy according to the spatial correlations of pixels in a frame, and inter-frame coding that eliminates redundancy according to temporal correlations between different frames.

FIGS. 9(a) and 9(b) are diagrams for explaining the intra-frame coding and the inter-frame coding, respectively. As shown in FIG. 9(a), in a still picture, there is a strong possibility that adjacent pixels will have the same or near pixel values. The intra-coding employs this correlation for compression, according to the conception of space frequency.

On the other hand, as shown in FIG. 9(b), a moving picture is digitized and treated as plural pieces of still pictures. There is a strong possibility that, among the plural still pictures, adjacent still pictures like N−1 and N will be identical or similar, and the inter-frame coding is carried out on the basis of this fact. For example, a difference between digital image data N−1 and N is obtained, and only a portion of N different from N−1 is subjected to the subsequent processing, thereby to compress the image data. Even in the inter-frame coding, the first still picture is processed by the intra-frame coding.

In the above-mentioned compressive coding, to increase the compression ratio results in degraded image quality. So, in order to achieve appropriate compression, "rate control" for controlling the coded data generation rate is required. This rate control is performed by appropriately setting the quantization scale according to the input data because the quantization scale, which is used for division in the above-mentioned quantization process, is directly linked with the information quantity generated as coded data.

An image coding apparatus performing such rate control according to a prior art (ISO-IEC/JIC1/SC29/WG11 NO328) will be described hereinafter.

FIG. 7 is a block diagram illustrating the image coding apparatus. As shown in the figure, the apparatus comprises a subtracter 1, an image transformer 2, a quantizer 3, a variable-length encoder 4, an inverse quantizer 5, an inverse image transformer 6, an adder 7, an image storage unit 8, an activity calculator 22, and a quantization scale decision unit 23.

The subtracter 1 calculates a difference between an input image per coding unit and a reference image created from an already coded image, providing an input image to be transformed. The image transformer 2 receives the input image to be transformed, and performs prescribed transformation to the image, thereby generating a transformed image. The quantizer 3 quantizes the transformed image according to a modified quantization scale from the quantization scale decision unit 23, thereby generating a transformed and quantized coefficient. The variable-length encoder 4 receives the transformed and quantized coefficient and performs variable-length coding, thereby generating a coding result to which the modified quantization scale is added. Further, the encoder 4 measures the information quantity of the coding result and outputs it to the quantization scale decision unit 23. The inverse quantizer 5 receives the transformed and quantized coefficient and the modified quantization scale, and generates inversely quantized image. The inverse image transformer 6 receives the inversely quantized image and performs prescribed inverse transformation, thereby generating an inversely transformed image. The adder 7 adds the reference image and the inversely transformed image to generate a locally decoded image. The image storage unit 8 stores the locally decoded image for a prescribed period of time, and outputs the reference image.

The activity calculator 22 calculates an activity and an average activity which are used for performing rate control with a modified quantization scale. The quantization scale decision unit 23 decides a modified quantization scale on the basis of the activity and the average activity calculated by the activity calculator 22, the information quantity of the coding result output from the variable-length encoder 4, and a given target bit number. The modified quantization scale is input to the quantizer 3, the inverse quantizer 5, and the variable-length encoder 4.

A description is given of the operation of the image coding apparatus shown in FIG. 7, with respect to [A. Coding], [B. Local Decoding], and [C. Rate Control].

[A. Coding]

Initially, an image is divided into plural sub-areas according to digitized data of the image, and each sub-area image is successively input to the apparatus as an input image S100 per coding unit. The input image is composed of four luminance signal blocks and two color-difference signal blocks, and each block comprises 8×8 pixels. This block set is called a macroblock. The image S100 per coding unit (macroblock) is coded by the intra-frame coding or the inter-frame coding based on a prescribed criterion. In this example, only the first macroblock is coded by intra-frame coding, and subsequent macroblocks are coded by the inter-frame coding.

In a local decoding process described later, a reference image S108 is generated using a locally decoded image S107 stored in the image storage unit 8, and an input image S101 to be transformed is generated from the image S100 and the reference image S108 by the subtracter 1. The input image S101 is transformed in the image transformer 2 to be a transformed image S102. The transformed image S102 is quantized by the quantizer 3 to be a transformed and quantized coefficient S103. The quantization scale used in the quantization is decided for each coding target (macroblock). An initial value set in advance is used at the beginning and, when a modified quantization scale is given by the quantization scale decision unit 23, the modified quantization scale is used thereafter.

Further, the variable-length encoder 4 performs run-length coding to the transformed and quantized coefficient S103 in a prescribed order from the lower band toward the higher band, and outputs a bitstream S104 which is the coding result of the image S100. Further, for rate control, the variable-length encoder 4 measures the information quantity of the coding result as bit number b and outputs this toward the quantization scale decision unit 23.

[B. Local Decoding]

As described above, in the inter-frame coding, a difference image is obtained using a previously processed image as a reference image S108, so that it is necessary to locally decode the coded data so that the decoding result can be used as the reference image.

The transformed and quantized coefficient S103 obtained by the quantizer is also input to the inverse quantizer 5. Then, the inverse quantizer 5 performs inverse quantization to generate an inversely quantized image S105. The inversely quantized image S105 is inversely transformed by the inverse image transformer 6 to be an inversely transformed image S106. The inversely transformed image S106 is added to the reference image by the adder 7, thereby generating a locally decoded image S107. The locally decoded image S107 is stored in the image storage unit 8 for a prescribed period of time, whereby a reference image S108 for the next input is obtained.

[C. Rate Control]

Rate control by modifying the quantization scale is carried out as follows. The activity calculator 22 calculates an activity act per input image S100, and outputs the activity to the quantization scale decision unit 23. To be specific, the activity is obtained by calculating variances of the respective blocks of luminance signal in the image S100 and adding 1 to the smallest variance. Further, the activity calculator 22 obtains an average of activities of the input image S100 within the frame, and outputs an average activity avg_act toward the quantization scale decision unit 23. The average activity avg_act input to the quantization scale decision unit 23 is a value calculated with respect to a frame for which coding has just been completed.

The quantization scale decision unit 23 decides a modified quantization scale, according to a target bit number Tb of coding result generated in a frame obtained by a prescribed method, the bit number b obtained as the information quantity of the above-mentioned coding result, the activity act of the image S100, and the average activity avg_act.

The quantization scale decision unit 23 decides the modified quantization scale in the following manner. The quantization scale decision unit 23 retains parameters of buffer fullness dj (quantity of data in a virtual buffer) corresponding to the respective coding modes for coding the original image, i.e., intra-frame coding, inter-frame coding using forward prediction, and inter-frame coding using bidirectional prediction, and it performs rate control based on the buffer fullness dj. The buffer fullness dj is updated to a value obtained in formula (1) when coding of the image S100 has been completed.

$$dj = d0 + b - \frac{Tb}{MBn} \quad (1)$$

where d0 is a value of buffer fullness dj when processing of a previous macroblock has just been completed, and MBn is the number of macroblocks constituting the frame of the original image.

Using the buffer fullness dj, a quantization scale qj is obtained in formula (2).

$$qj = \frac{dj \times 31}{r} \quad (2)$$

where r is the reaction parameter which is represented by formula (3). In formula (3), bit_rate is the target bit number of coding result per second, and picture_rate is the number of input original images per second.

$$r = \frac{(bit\_rate)}{(picture\_rate)} \quad (3)$$

Further, the quantization scale qj is subjected to modulation in formula (4), thereby generating a modified quantization scale mg. The modified quantization scale mg is input to the quantizer 3.

$$mq = qj \times \frac{2 \times act + avg\_act}{act + 2 \times avg\_act} \qquad (4)$$

On the basis of the modified quantization scale mg obtained in formula (4), the quantizer 3 performs quantization. In addition, the modified quantization scale mq is input to the inverse quantizer 5 and to the variable-length encoder 4. In the inverse quantizer 5, it is used for inverse quantization. In the variable-length encoder 4, it is coded and incorporated in the coding result. That is, it is incorporated as information to be used for inverse quantization when the coding result is subjected to decoding.

As described above, in the image coding apparatus according to the prior art, the quantizer 3 modifies the quantization scale for quantization by feedback control, thereby to perform rate control. Therefore, the data quantity of the coding result can be approximated to the target data quantity set in advance.

However, the image coding apparatus has the following drawbacks.

In the image coding apparatus, rate control is carried out for the purpose of making the bit number per coding unit (macroblock) uniform by adjusting it to the target bit number. That is, in formula (1), an error between "the bit number b of coding result output for each macroblock" and "the value obtained by equally dividing the target bit number Tb with the number of macroblocks" is accumulated and fed back, thereby to realize rate control. In this case, appropriate rate control is possible as long as the information quantity of the input image to be transformed (S101 in FIG. 7) is uniform over the original image. However, when the information quantity of the input image is considerably biased, rate control doe s not function satisfactorily. Further, because of the rate control, local characteristics of the original image cannot be reflected, resulting in degraded quality of coded image.

SUMMARY OF THE INVENTION

It is an object of the present invention to provide an image coding apparatus that reflects local characteristics of an original image, and that improves precision in rate control and image quality of coding result.

It is another object of the present invention to provide an image coding method that reflects local characteristics of an original image, and that improves precision in rate control and image quality of coding result.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the invention, there is provided an image coding apparatus that receives an input image per coding unit, which is obtained by dividing an original digital image in coding units, and codes the input image to obtain coded data, and the apparatus comprises subtraction means for providing a difference image between the input image per coding unit and a reference image generated from a coded image which has already been coded; image transform means for receiving, as an input image to be transformed, one of the input image per coding unit and the difference image, and performing a prescribed transformation process to the input image to be transformed, thereby to obtain a transformed image; quantization means for quantizing the transformed image by one of a prescribed quantization scale and a modified quantization scale which is given from a quantization scale decision means described later, thereby to obtain transformed and quantized coefficients; coding means for coding the transformed and quantized coefficients to obtain coded data, and outputting the coded data; local characteristic value calculation means for obtaining a complexity index value from the input image to be transformed and, using the complexity index value, calculating local characteristic values which are used for modification of the quantization scale; control information set means for setting control information which is used for modification of the quantization scale; and quantization scale decision means for modifying the quantization scale using the quantity of the coded data output from the coding means, the local characteristic values calculated by the local characteristic value calculation means, and the control information set by the control information set means, and outputting the modified quantization scale toward the quantization means. In this structure, the local characteristic value calculation means obtains the complexity index value on the basis of the input image to be transformed, which image is a difference between the input image per coding unit and the reference image and, on the basis of the complexity index value, it calculates the local characteristic values to be used for modification of the quantization scale. The control information set means sets the control information to be used for rate control, and the quantization scale decision means modifies the quantization scale in the quantization process using the local characteristic values and the control information, whereby rate control is carried out.

According to a second aspect of the invention, in the above-mentioned image coding apparatus, the local characteristic value calculation means is a parameter calculation means which provides, as the local characteristic values, quantization scale modification parameters calculated on the basis of the complexity index values, an image significance decision result obtained as a result of comparison of the complexity index value of each input image to be transformed with a prescribed value, and a significant image area ratio showing the number of the input images to be transformed whose image significance decision results are "significant", and the parameter calculation means outputs the quantization scale modification parameters, the image significance decision result, and the significant image area ratio toward the quantization scale decision means; the control information set means sets a target value of the quantity of the coded data as a target data quantity, and outputs the target data quantity toward the quantization scale decision means; and the quantization scale decision means decides the modified quantization scale, on the basis of the target data quantity output from the control information set means, and the quantization scale parameters, the significant image area ratio and the image significance decision result which are output from the parameter calculation means. In this structure, rate control is carried out by modifying the quantization scale by the quantization scale decision means using the quantization scale modification parameters, the image significance decision result, and the significant image area ratio which are obtained by the parameter calculation means, and the target data quantity set by the control information set means.

According to a third aspect of the invention, the above-mentioned image coding apparatus further comprises control information storage means for storing control information used for modification of the quantization scale. In the apparatus, the local characteristic value calculation means is a complexity calculation means which provides a complexity mean value being an average of the complexity index values, an image significance decision result being a result of comparison of the complexity index value of each input image to be transformed with a prescribed value, and a significant image area ratio showing the number of the input images to be transformed whose image significance decision results are "significant", and the complexity calculation means outputs the complexity mean value and the significant image area ratio toward the control information storage means as control information while outputs the complexity index values toward the quantization scale decision means; the control information set means sets a target value of the quantity of the coded data as a target data quantity, sets a complexity mean value and a significant image area ratio on the basis of the control information stored in the control information storage means, and outputs the target data quantity, the complexity mean value, and the significant image area ratio toward the quantization scale decision means; and the quantization scale decision means decides the modified quantization scale, on the basis of quantization scale modification parameters calculated from the complexity index values, and the complexity mean value, the significant image area ratio and the target data quantity which are output from the control information set means. In this structure, rate control is carried out by modifying the quantization scale by the quantization scale decision means using the complexity index values obtained by the complexity calculation means, the complexity mean value and the significant image area ratio which are set by the control information set means on the basis of the stored content of the control information storage means, and the target data quantity set by the control information set means.

According to a fourth aspect of the invention, in the above-mentioned image coding apparatus, the local characteristic value calculation means is a parameter calculation means which provides a complexity mean value being an average of the complexity index values with respect to the original image, modulation parameters obtained from the statistical characteristics of the complexity index values, and weighting parameters obtained from the complexity index values using a prescribed function, calculates quantization scale modification parameters from the complexity index values, the complexity index mean value, and the modulation parameters, and outputs the weighting parameters and the quantization scale modification parameters toward the quantization scale decision means; the control information set means sets a target value of the quantity of the coded data as a target data quantity, sets quantization characteristic information showing quantization characteristics for decision of the quantization scale, and outputs the target data quantity and the quantization characteristic information toward the quantization scale decision means; and the quantization scale decision means decides the modified quantization scale, on the basis of the quantization scale modification parameters output from the parameter calculation means, and the quantization characteristic information and the target data quantity which are output from the control information set means. In this structure, rate control is carried out by modifying the quantization scale by the quantization scale decision means using the weighting parameters and the quantization scale modification parameters which are obtained by the parameter calculation means, and the target data quantity and the quantization characteristic information which are set by the control information set means.

According to a fifth aspect of the invention, the above-mentioned image coding apparatus further comprises control information storage means for storing control information used for modification of the quantization scale. In the apparatus, the local characteristic value calculation means is a complexity calculation means which outputs the complexity index values as the control information to the control information storage means; the control information set means obtains a complexity mean value as an average of the complexity index values with respect to the original image, and modulation parameters from the statistical characteristics of the complexity index values, on the basis of the complexity index values stored in the control information storage means, calculates quantization scale modification parameters from the complexity index values, the complexity index mean value, and the modulation parameters, and obtains weighting parameters from the complexity index values using a prescribed function; the control information set means sets a target value of the quantity of the coded data as a target data quantity, and sets quantization characteristic information showing characteristics of quantization for decision of the quantization scale; the control information set means outputs the quantization scale modification parameters, the weighting parameters, the target data quantity, and the quantization characteristic information toward the quantization scale decision means; and the quantization scale decision means decides the modified quantization scale, on the basis of the quantization scale modification parameters, the weighting parameters, the quantization characteristic information, and the target data quantity which are output from the control information set means. In this structure, rate control is carried out by modifying the quantization scale by the quantization scale decision means, using the weighting parameters, the quantization scale modification parameters, the quantization characteristic information, and the target data quantity, which are set by the control information set means on the basis of the complexity index values calculated by the complexity calculation means and stored in the control information storage means.

According to a sixth aspect of the invention, there is provided a recording medium containing coded image data, wherein the coded image data are coded data output from the above-mentioned image coding apparatus.

According to a seventh aspect of the invention, there is provided an image decoding apparatus for decoding coded image data to obtain an image, and the apparatus comprises variable-length decoding means for decoding coded image data to generate a transformed and quantized image, reference image information, and a modified quantization scale; inverse quantization means for performing inverse quantization to the transformed and quantized image using the modified quantization scale, thereby to obtain an inversely quantized image; inverse image transform means for performing inverse transform to the inversely quantized image, thereby to obtain an inversely transformed image; addition means for generating a decoded image using the inversely transformed image and a reference image which is obtained from image storage means described later; and image storage means for storing the decoded image for a prescribed period of time, generating a reference image from the stored decoded image and the reference image information output from the variable-length decoding means, and outputting the reference image to the addition means; wherein the coded data output from the above-mentioned image coding apparatus is processed as the coded image data.

According to an eighth aspect of the invention, there is provided an image coding method wherein an input image per coding unit, which is obtained by dividing an original digital image in coding units, is coded to obtain coded data, and the method comprises subtraction step of providing a difference image between the input image per coding unit and a reference image generated from a coded image which has already been coded; image transform step of receiving, as an input image to be transformed, one of the input image per coding unit and the difference image, and performing a prescribed transformation process to the input image to be transformed, thereby to obtain a transformed image; quantization step of quantizing the transformed image by one of a prescribed quantization scale and a modified quantization scale which is decided in a quantization scale decision step described later, thereby to obtain transformed and quantized coefficients; coding step of coding the transformed and quantized coefficients to generate coded data; local characteristic value calculation step of obtaining a complexity index value from the input image to be transformed and, using the complexity index value, calculating local characteristic values which are used for modification of the quantization scale; control information set step of setting control information which is used for modification of the quantization scale; and quantization scale decision step of modifying the quantization scale using the quantity of the coded data generated in the coding step, the local characteristic values calculated in the local characteristic value calculation step, and the control information set in the control information set step, thereby to decide a modified quantization scale. In this method, in the local characteristic value calculation step, the complexity index value is obtained on the basis of the input image to be transformed, which image is a difference between the input image per coding unit and the reference image and, on the basis of the complexity index value, the local characteristic values to be used for modification of the quantization scale are calculated. In the control information set step, the control information to be used for rate control is set and, in the quantization scale decision step, the quantization scale is modified using the local characteristic values and the control information, whereby rate control is carried out.

According to a ninth aspect of the invention, in the above-mentioned image coding method, the local characteristic value calculation step is a parameter calculation step in which quantization scale modification parameters are calculated on the basis of the complexity index values, an image significance decision result is obtained as a result of comparison of the complexity index value of each input image to be transformed with a prescribed value, and a significant image area ratio is obtained, which ratio shows the number of the input images to be transformed whose image significance decision results are "significant"; in the control information set step, a target value of the quantity of the coded data is set as a target data quantity; and in the quantization scale decision step, the modified quantization scale is decided on the basis of the target data quantity set in the control information set step, and the quantization scale parameters, the significant image area ratio and the image significance decision result which are calculated in the parameter calculation step. In this method, rate control is carried out by modifying the quantization scale in the quantization scale decision step using the quantization scale modification parameters, the image significance decision result, and the significant image area ratio which are obtained in the parameter calculation step, and the target data quantity set in the control information set step.

According to a tenth aspect of the invention, in the above-mentioned image coding method, the local characteristic value calculation step is a complexity calculation step in which a complexity mean value is obtained as an average of the complexity index values, an image significance decision result is obtained as a result of comparison of the complexity index value of each input image to be transformed with a prescribed value, and a significant image area ratio is obtained, which ratio shows the number of the input images to be transformed whose image significance decision results are "significant"; in the control information set step, a target value of the quantity of the coded data is set as a target data quantity, and a complexity mean value and a significant image area ratio are set on the basis of control information including the complexity mean value and the significant image area ratio; and in the quantization scale decision step, the modified quantization scale is decided on the basis of quantization scale modification parameters calculated from the complexity index values, and the complexity mean value, the significant image area ratio and the target data quantity which are set in the control information set step. In this method, rate control is carried out by modifying the quantization scale in the quantization scale decision step using the complexity index values obtained in the complexity calculation step, the complexity mean value and the significant image area ratio which are set in the control information set step, and the target data quantity set in the control information set step.

According to an eleventh aspect of the invention, in the above-mentioned image coding method, the local characteristic value calculation step is a parameter calculation step in which a complexity mean value is obtained as an average of the complexity index values with respect to the original image, modulation parameters are obtained from the statistical characteristics of the complexity index values, weighting parameters are obtained from the complexity index values using a prescribed function, quantization scale modification parameters are calculated using the complexity index values, the complexity index mean value, and the modulation parameters, and the weighting parameters and the quantization scale modification parameters are generated so that these parameters can be used in the quantization scale decision step; in the control information set step, a target value of the quantity of the coded data is set as a target data quantity, quantization characteristic information showing quantization characteristics for decision of the quantization scale is set, and the target data quantity and the quantization characteristic information are output so that these can be used in the quantization scale decision step; and in the quantization scale decision step, the modified quantization scale is decided on the basis of the quantization scale modification parameters calculated in the parameter calculation step, and the quantization characteristic information and the target data quantity which are set in the control information set step. In this method, rate control is carried out by modifying the quantization scale in the quantization scale decision step using the weighting parameters and the quantization scale modification parameters which are obtained in the parameter calculation step, and the target data quantity and the quantization characteristic information which are set in the control information set step.

According to a twelfth aspect of the invention, in the above-mentioned image coding method, in the control information set step, on the basis of the complexity index values being the control information, a complexity mean value is obtained as an average of the complexity index values with respect to the original image, modulation parameters are obtained from the statistical characteristics of the complexity index values, quantization scale modification parameters are calculated using the complexity index values, the complexity mean value, and the modulation parameters, weighting parameters are obtained from the complexity index values using a prescribed function, a target value of the quantity of the coded data is set as a target data quantity, and quantization characteristic information showing characteristics of quantization for decision of the quantization scale is set; and in the quantization scale decision step, the modified quantization scale is decided on the basis of the quantization scale modification parameters, the weighting parameters, the quantization characteristic information, and the target data quantity which are set in the control information set step. In this method, rate control is carried out by modifying the quantization scale in the quantization scale decision means, using the weighting parameters, the quantization scale modification parameters, the quantization characteristic information, and the target data quantity, which are set in the control information set step, on the basis of the complexity index values.

According to a thirteenth aspect of the invention, there is provided an image decoding method for decoding coded image data to obtain an image, and the method comprises variable-length decoding step of decoding coded image data to generate a transformed and quantized image, reference image information, and a modified quantization scale; inverse quantization step of performing inverse quantization to the transformed and quantized image using the modified quantization scale, thereby to obtain an inversely quantized image; inverse image transform step of performing inverse transform to the inversely quantized image, thereby to obtain an inversely transformed image; addition step of generating a decoded image using the inversely transformed image and a reference image which is generated in an image storage step described later; and image storage step of storing the decoded image for a prescribed period of time, and generating a reference image from the stored decoded image and the reference image information generated in the variable-length decoding step; wherein the coded data obtained by the above-mentioned image coding method is processed as the coded image data.

According to a fourteenth aspect of the invention, there is provided a method for transmitting coded image data, wherein the coded image data are coded data processed in the above-mentioned image coding method.

According to a fifteenth aspect of the invention, there is provided a recording medium containing an image coding program for coding an input image per coding unit, which image is obtained by dividing an original digital image in coding units, thereby to obtain coded data, and the image coding program comprises subtraction step of providing a difference image between the input image per coding unit and a reference image generated from a coded image which has already been coded; image transform step of receiving, as an input image to be transformed, one of the input image per coding unit and the difference image, and performing a prescribed transformation process to the input image to be transformed, thereby to obtain a transformed image; quantization step of quantizing the transformed image by one of a prescribed quantization scale and a modified quantization scale which is decided in a quantization scale decision step described later, thereby to obtain transformed and quantized coefficients; coding step of coding the transformed and quantized coefficients to generate coded data; local characteristic value calculation step of obtaining a complexity index value from the input image to be transformed and, using the complexity index value, calculating local characteristic values which are used for modification of the quantization scale; control information set step of setting control information which is used for modification of the quantization scale; and quantization scale decision step of modifying the quantization scale using the quantity of the coded data generated in the coding step, the local characteristic values calculated in the local characteristic value calculation step, and the control information set in the control information set step, thereby to decide a modified quantization scale. By executing the image coding program in a computer system or the like, rate control is carried out as follows. In the local characteristic value calculation step, the complexity index value is obtained on the basis of the input image to be transformed, which image is a difference between the input image per coding unit and the reference image and, on the basis of the complexity index value, the local characteristic values to be used for modification of the quantization scale are calculated. In the control information set step, the control information to be used for rate control is set and, in the quantization scale decision step, the quantization scale is modified using the local characteristic values and the control information, whereby rate control is carried out.

According to a sixteenth aspect of the invention, in the above-mentioned recording medium, the local characteristic value calculation step of the image coding program is a parameter calculation step in which quantization scale modification parameters are calculated on the basis of the complexity index values, an image significance decision result is obtained as a result of comparison of the complexity index value of each input image to be transformed with a prescribed value, and a significant image area ratio is obtained, which ratio shows the number of the input images to be transformed whose image significance decision results are "significant"; in the control information set step of the image coding program, a target value of the quantity of the coded data is set as a target data quantity; and in the quantization scale decision step of the image coding program, the modified quantization scale is decided on the basis of the target data quantity set in the control information set step, and the quantization scale parameters, the significant image area ratio and the image significance decision result which are calculated in the parameter calculation step. By executing the image coding program in a computer system or the like, rate control is carried out by modifying the quantization scale in the quantization scale decision step using the quantization scale modification parameters, the image significance decision result, and the significant image area ratio which are obtained in the parameter calculation step, and the target data quantity set in the control information set step.

According to a seventeenth aspect of the invention, in the above-mentioned recording medium, the local characteristic value calculation step of the image coding program is a complexity calculation step in which a complexity mean value is obtained as an average of the complexity index values, an image significance decision result is obtained as a result of comparison of the complexity index value of each input image to be transformed with a prescribed value, and a significant image area ratio is obtained, which ratio shows the number of the input images to be transformed whose image significance decision results are "significant"; in the control information set step of the image coding program, a target value of the quantity of the coded data is set as a target data quantity, and a complexity mean value and a significant image area ratio are set on the basis of control information including the complexity mean value and the significant image area ratio; and in the quantization scale decision step of the image coding program, a modified quantization scale is decided on the basis of quantization scale modification parameters calculated from the complexity index values, and the complexity mean value, the significant image area ratio and the target data quantity which are set in the control information set step. By executing the image coding program in a computer system or the like, rate control is carried out by modifying the quantization scale in the quantization scale decision step using the complexity index values obtained in the complexity calculation step, the complexity mean value and the significant image area ratio which are set in the control information set step, and the target data quantity set in the control information set step.

According to an eighteenth aspect of the invention, in the above-mentioned recording medium, the local characteristic value calculation step of the image coding program is a parameter calculation step in which a complexity mean value is obtained as an average of the complexity index values with respect to the original image, modulation parameters are obtained from the statistical characteristics of the complexity index values, weighting parameters are obtained from the complexity index values using a prescribed function, quantization scale modification parameters are calculated using the complexity index values, the complexity index mean value, and the modulation parameters, and the weighting parameters and the quantization scale modification parameters are generated so that these parameters can be used in the quantization scale decision step; in the control information set step of the image coding program, a target value of the quantity of the coded data is set as a target data quantity, quantization characteristic information showing quantization characteristics for decision of the quantization scale is set, and the target data quantity and the quantization characteristic information are output so that these can be used in the quantization scale decision step; and in the quantization scale decision step of the image coding program, the modified quantization scale is decided on the basis of the quantization scale modification parameters calculated in the parameter calculation step, and the quantization characteristic information and the target data quantity which are set in the control information set step. By executing the image coding program in a computer system or the like, rate control is carried out by modifying the quantization scale in the quantization scale decision step using the weighting parameters and the quantization scale modification parameters which are obtained in the parameter calculation step, and the target data quantity and the quantization characteristic information which are set in the control information set step.

According to a nineteenth aspect of the invention, in the above-mentioned recording medium, in the control information set step of the image coding program, on the basis of the complexity index values being the control information, a complexity mean value is obtained as an average of the complexity index values with respect to the original image, modulation parameters are obtained from the statistical characteristics of the complexity index values, quantization scale modification parameters are calculated using the complexity index values, the complexity mean value, and the modulation parameters, weighting parameters are obtained from the complexity index values using a prescribed function, a target value of the quantity of the coded data is set as a target data quantity, and quantization characteristic information showing characteristics of quantization for decision of the quantization scale is set; and in the quantization scale decision step of the image coding program, the modified quantization scale is decided on the basis of the quantization scale modification parameters, the weighting parameters, the quantization characteristic information, and the target data quantity which are set in the control information set step. By executing the image coding program in a computer system or the like, rate control is carried out by modifying the quantization scale in the quantization scale decision means, using the weighting parameters, the quantization scale modification parameters, the quantization characteristic information, and the target data quantity, which are set in the control information set step, on the basis of the complexity index values.

According to a twentieth aspect of the invention, there is provided a recording medium containing an image decoding program for decoding coded image data to obtain an image, and the image decoding program comprises variable-length decoding step of decoding coded image data to generate a transformed and quantized image, reference image information, and a modified quantization scale; inverse quantization step of performing inverse quantization to the transformed and quantized image using the modified quantization scale, thereby to obtain an inversely quantized image; inverse image transform step of performing inverse transform to the inversely quantized image, thereby to obtain an inversely transformed image; addition step of generating a decoded image using the inversely transformed image and a reference image which is generated in an image storage step described later; and image storage step of storing the decoded image for a prescribed period of time, and generating a reference image from the stored decoded image and the reference image information generated in the variable-length decoding step; wherein the coded data obtained by the above-mentioned image coding method is processed as the coded image data. By executing the image decoding program in a computer system or the like, coded data processed in the above-mentioned image coding method is decoded.

DETAILED DESCRIPTION OF THE PREFERRED EMBODIMENTS

[Embodiment 1]

In an image coding apparatus according to a first embodiment of the invention, when rate control is performed, modification of quantization scale is carried out on the basis of a complexity index value in a difference image between an input image per coding unit and a reference image.

Figure 1:
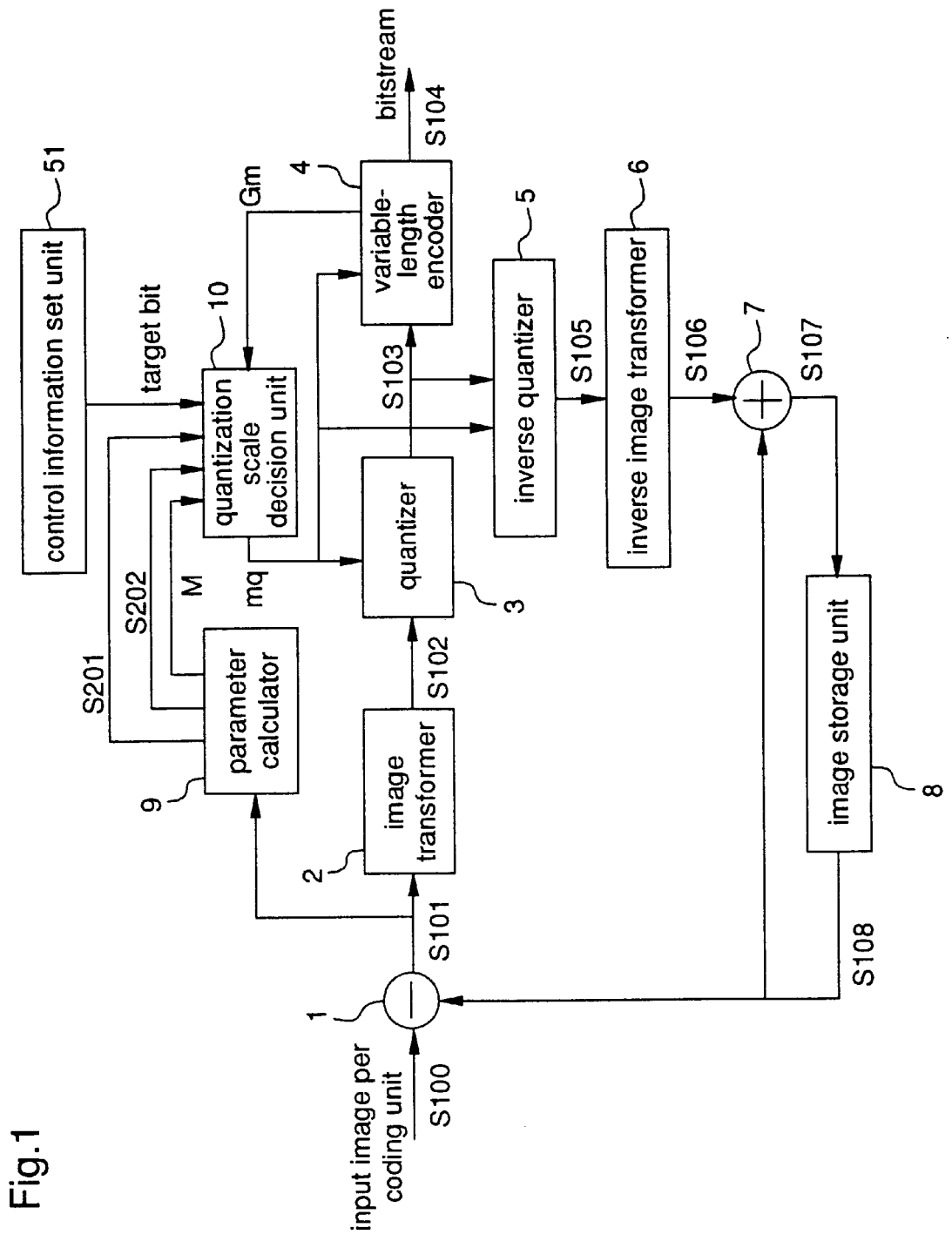
FIG. 1 is a block diagram illustrating an image coding apparatus according to a first embodiment of the present invention.

FIG. 1 is a block diagram illustrating an image coding apparatus according to the first embodiment of the invention. With reference to FIG. 1, the apparatus comprises a subtracter 1, an image transformer 2, a quantizer 3, a variable-length encoder 4, an inverse quantizer 5, an inverse image transformer 6, an adder 7, an image storage unit 8, a parameter calculator 9, a quantization scale decision unit 10, and a control information set unit 51.

The parameter calculator 9 obtains a complexity index value of an input image S101 to be transformed, and calculates a quantization scale modification parameter, an image significance decision result, and a significant image area ratio, using the complexity index value. The result of the calculation is input to the quantization scale decision unit 10. The quantization scale decision unit 10 decides a modified quantization scale on the basis of the data quantity of the coding result output from the variable-length encoder 4, the quantization scale modification parameter output from the parameter calculator 9, the image significance decision result, the significant image area ratio, and a target data quantity Tp output from the control information set unit 51. The modified quantization scale output from the quantization scale decision unit 10 is input to the quantizer 3, the inverse quantizer 5, and the variable-length encoder 4. The control information set unit 51 obtains a target value of output data quantity of coding result by a prescribed method, and outputs this value to the quantization scale decision unit 10 as the target data quantity Tp. The subtracter 1, image transformer 2, quantizer 3, variable-length encoder 4, inverse quantizer 5, inverse image transformer 6, adder 7, and image storage unit 8 are identical to those already described for the prior art and, therefore, do not require repeated description.

A description is given of the operation of the image coding apparatus so constructed, with respect to image coding and rate control. The apparatus according to this first embodiment performs [A. Coding], [B. Local Decoding], and [C. Rate Control], like the prior art apparatus. Since [A. Coding] and [B. Local Decoding] according to this first embodiment are identical to those already described for the prior art, only [C. Rate Control] will be described hereinafter.

[C. Rate Control]

While the prior art apparatus employs an activity obtained from the input image per coding unit (S100) to provide a modified quantization scale, the apparatus according to this first embodiment employs a complexity index value obtained from the input image to be transformed (S101) which is output from the subtracter 1.

Initially, the parameter calculator 9 obtains a complexity index value va per input image S101. The complexity index value va is the total of variances of the respective blocks of luminance signal in the input image S101. Next, the complexity index values va of the original image are averaged to obtain a complexity mean value va_mean. Then, a quantization scale modification parameter M is obtained by formula (5) using the complexity index value va and the complexity mean value va_mean.

$$M = \frac{2 \times va + va\_mean}{va + 2 \times va\_mean} \quad (5)$$

Further, the parameter calculator 9 compares the complexity index value va obtained for each input image S101 with a prescribed value. When the complexity index value va is larger than the prescribed value, the calculator 9 decides that the input image is significant. When the complexity index value va is smaller than the prescribed value, the calculator 9 decides that the input image is insignificant. As the result of the decision, an image significance decision result S201 showing "significant" or "insignificant" is obtained. Further, a significant image area ratio S202 is obtained as the number of input images which are decided as significant images. The parameter calculator 9 outputs the quantization scale modification parameter M, the image significance decision result S201 showing "significant" or "insignificant", and the significant image area ratio S202, toward the quantization scale decision unit 10.

The quantization scale decision unit 10 performs feedback to rate control using information quantity Gm of the coding result output from the variable-length encoder 4, according to formulae (6a) and (6b).

$$D(j) = D(j-1) + Gm - \frac{1}{MBa} \times Tp \quad (6a)$$

(case of significant image area)

$$D(j)=D(j-1) \quad (6b)$$

(case of insignificant image area)

where Dj is the buffer fullness used for coding of the j-th input image per coding unit, Gm is the quantity of coded data output from the variable-length encoder 4, and MBa is a value obtained from the significant image area ratio S202 output from the parameter calculator 9, and this value shows the significant image area ratio of a frame for which coding has just been completed.

Using the buffer fullness D(j) obtained in formula (6a) or (6b) and the reaction parameter r obtained in the same manner as in the prior art, a quantization scale qj is obtained in formula (7).

$$qj = \frac{D(j) \times 31}{r} \quad (7)$$

Further, the quantization scale qj is modified in formula (8) using the quantization scale modification parameter M, providing a modified quantization scale mq. The modified quantization scale mq is input to the quantization unit 3.

$$mq=M \times q; \quad (8)$$

As described above, in this first embodiment, rate control for the quantity of coded data is performed by modifying the quantization scale used by the quantizer 3.

According to the first embodiment of the invention, the image coding apparatus is provided with the parameter calculator 9, and a complexity index value which is the total of variances of the respective blocks is obtained for each input image S101 which is a difference between the input image S100 and the reference image S108, and the complexity index value is used for modification of the quantization scale for rate control. In contrast with the prior art method using an activity of a block having the smallest variance in the input image S100, the apparatus according to the first embodiment enables rate control adaptive to the local characteristics of the image per coding unit. Therefore, as compared with the prior art apparatus, with similar hardware structure and equal processing time, the quality of coded image is improved and the precision of rate control is improved.

[Embodiment 2]

In an image coding apparatus according to a second embodiment of the invention, when performing rate control by modifying the quantization scale according to the complexity index value, some of characteristic values used for the rate control are obtained, not from the previously coded frame, but from the frame being the coding target, i.e., currently being processed.

Figure 2:
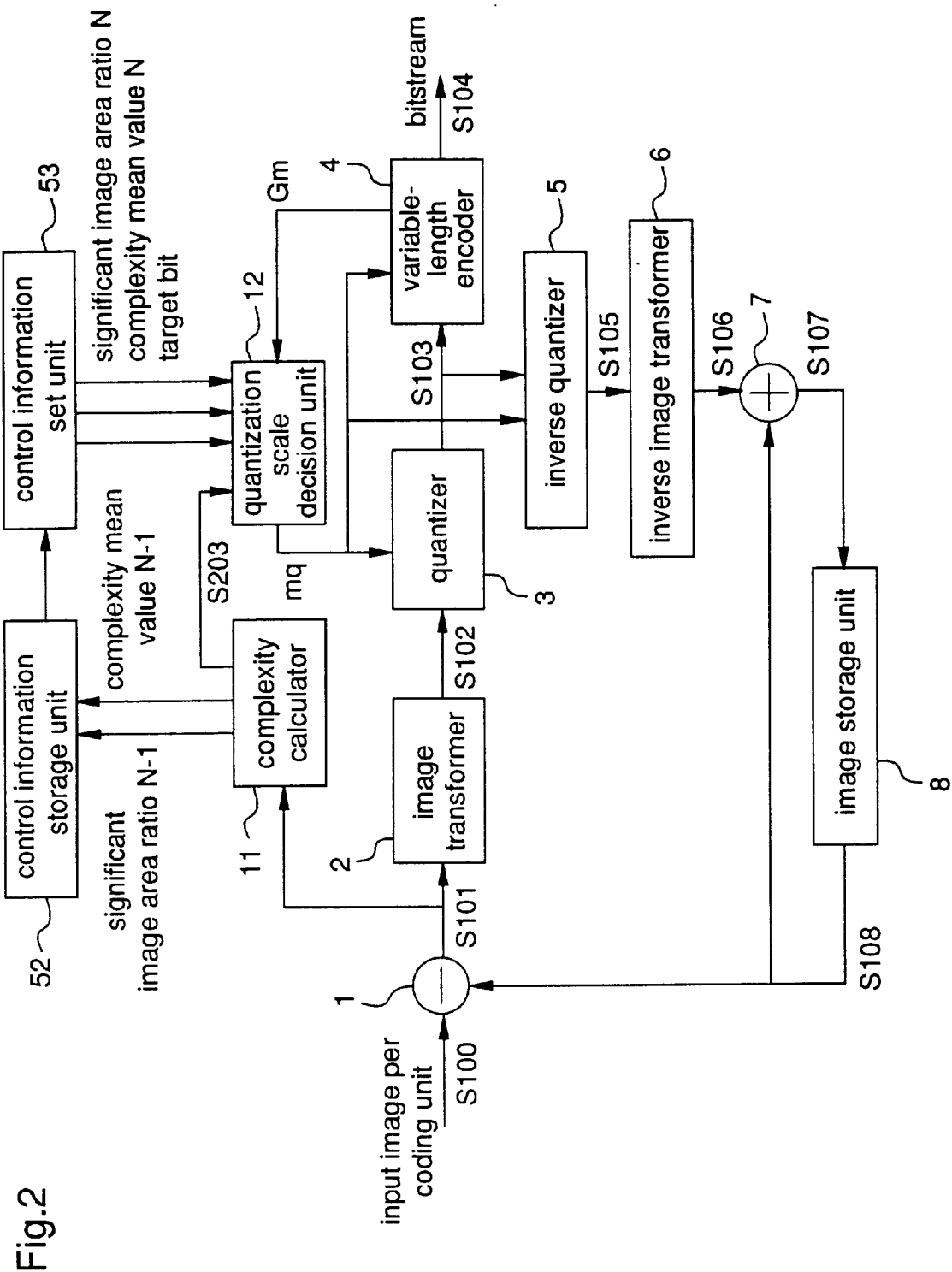
FIG. 2 is a block diagram illustrating an image coding apparatus according to a second embodiment of the present invention.

FIG. 2 is a block diagram illustrating an image coding apparatus according to a second embodiment of the invention. With reference to FIG. 2, the apparatus comprises a subtracter 1, an image transformer 2, a quantizer 3, a variable-length encoder 4, an inverse quantizer 5, an inverse image transformer 6, an adder 7, an image storage unit 8, a complexity calculator 11, a quantization scale decision unit 12, a control information set unit 53, and a control information storage unit 52.

The complexity calculator 11 obtains a complexity index value from an input image S101 to be transformed, and obtains a complexity mean value and a significant image area ratio from the complexity index value. The control information storage unit 52 stores control information used for modifying the quantization scale. The control information set unit 53 sets a target data quantity as described for the first embodiment, and sets the complexity mean value and the significant image area ratio according to the information stored in the information storage unit 52, and outputs these values toward the quantization scale decision unit 12. The quantization scale decision unit 12 obtains a quantization scale modification parameter and an image significance decision result, from the complexity index value output from the complexity calculator 11, and the complexity mean value and the significant image area ratio output from the control information set unit 53, and uses these for deciding a modified quantization scale. The subtracter 1, image transformer 2, quantizer 3, variable-length encoder 4, inverse quantizer 5, inverse image transformer 6, adder 7, and image storage unit 8 are identical to those already described for the prior art and, therefore, do not require repeated description.

A description is given of the operation of the image coding apparatus so constructed, with respect to image coding and rate control. The apparatus according to this second embodiment performs [A. Coding], [B. Local Decoding], and [C. Rate Control], like the prior art apparatus. Since [A. Coding] and [B. Local Decoding] according to this second embodiment are identical to those already described for the prior art, only [C. Rate Control] will be described hereinafter.

[C. Rate Control]

In the apparatus according to the first embodiment, the parameter calculator 9 obtains the complexity index value of the input image S101 to be transformed and, on the basis of the complexity index value, the calculator 9 obtains the quantization scale modification parameter, the image significance decision result, and the significant image area ratio and outputs these to the quantization scale decision unit 10. In contrast with the first embodiment, in the apparatus according to this second embodiment, the complexity calculator 11 obtains the complexity index value first and the complexity mean value and the significant image area ratio afterwards, and the complexity mean value and the significant image area ratio are output to the control information storage unit 52 and stored therein while only the complexity index value S203 is output to the quantization scale decision unit 12.

The control information set unit 53 outputs a target data quantity Tp, which is a target value of output data quantity of the coding result, towards the quantization scale decision unit 10. Further, receiving control information relating to the complexity mean value and the significant image area ratio from the control information storage unit 52, the control information set unit 53 outputs the complexity mean value and the significant image area ratio, as control information, toward the quantization scale decision unit 12.

The quantization scale decision unit 12 obtains a quantization scale modification parameter and an image significance decision result, on the basis of the complexity index value S203 from the complexity calculator 11, and the complexity mean value and the significant image area ratio from the control information set unit 53.

Calculations performed by the complexity calculator 11 and the quantization scale decision unit 12 are identical to those already described for the first embodiment.

In order to make the best use of the apparatus according to this second embodiment, for example, two-pass coding is effective. In the two-pass coding, the first pass is carried out in the same manner as described for the first embodiment, i.e., values relating to a frame N-1 for which coding has just been completed are used for calculation of the quantization scale modification parameter. The complexity mean value and the significant image area ratio obtained at the first pass are stored in the control information storage unit 52. In the second-pass coding, the control information set unit 53 obtains a complexity mean value N and a significant image area ratio N of a frame N being a coding target (hereinafter, referred to as a target frame) using the stored control information, and outputs these to the quantization scale decision unit 12.

However, the two-pass coding is not necessarily carried out. Even in one-pass coding, rate control can be carried out using characteristic values of the target frame N by setting the apparatus as follows. That is, a high-speed storage unit, such as a memory, is used as the control information storage unit 52, and the control information set means 53 fetches the stored information and sends it to the quantization scale decision unit 12. The quantizer 3 is given an appropriate delay so that it can perform quantization using a modified quantization scale calculated by the quantization scale decision means 12 using the information.

In the apparatus according to the first embodiment, rate control adaptive to the local characteristics is realized by using the complexity index value on the basis of the input image S101 to be transformed, in place of the activity based on the input image S100 used in the prior art apparatus. However, with respect to the characteristic values used for calculation to modify the quantization scale, those obtained for the previous frame N-1 are used, like the prior art apparatus. In contrast with the first embodiment, the apparatus according to the second embodiment can perform rate control using the characteristic values obtained for the target frame N being processed. In this second embodiment, however, since the two-pass coding or the one-pass coding with a delay is carried out, the processing time and burden are increased as compared with the first embodiment.

As described above, according to the second embodiment of the invention, the image coding apparatus includes the complexity calculator 11 and the control information storage unit 52, and the complexity mean value and the significant image area ratio output from the complexity calculator 11 are stored in the control information storage unit 52. Further, the control information set unit 53 fetches the information from the storage unit 52 and outputs it to the quantization scale decision unit 12. Hence, when the quantization scale decision unit 12 calculates the quantization scale modification parameter, the complexity mean value and the significant image area ratio used for the calculation are obtained, not from the previously coded frame N-1, but from the target frame N being processed, whereby more appropriate values can be set. Therefore, in the image coding apparatus according to this second embodiment, the quality of coded image and the precision in rate control are further improved.

[Embodiment 3]

In an image coding apparatus according to a third embodiment of the invention, when performing rate control by modifying the quantization scale according to the complexity index value, the modification is carried out using the statistical characteristics of the complexity index value.

Figure 3:
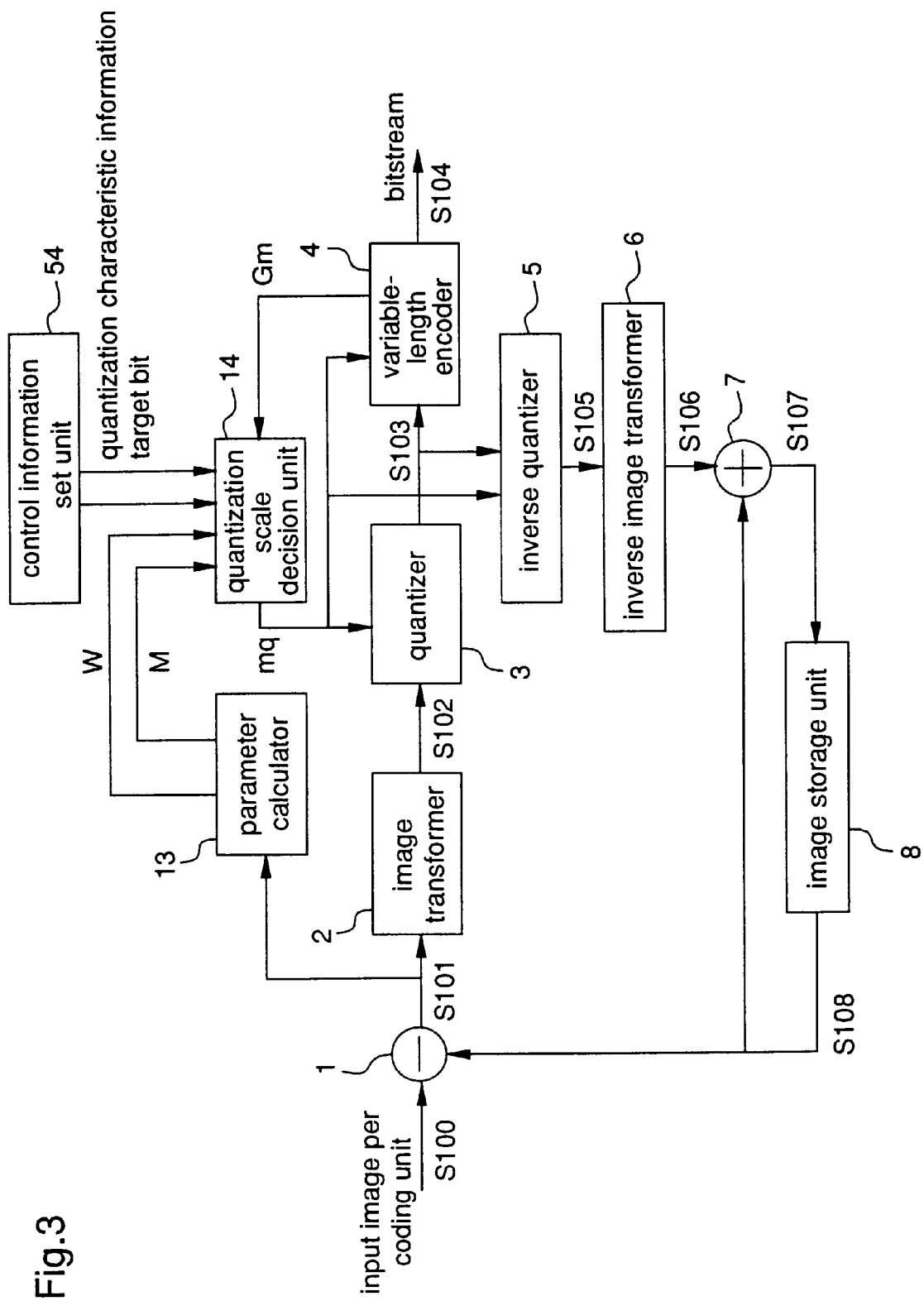
FIG. 3 is a block diagram illustrating an image coding apparatus according to a third embodiment of the present invention.

FIG. 3 is a block diagram illustrating an image coding apparatus according to a third embodiment of the invention. With reference to FIG. 3, the apparatus comprises a subtracter 1, an image transformer 2, a quantizer 3, a variable-length encoder 4, an inverse quantizer 5, an inverse image transformer 6, an adder 7, an image storage unit 8, a parameter calculator 13, a quantization scale decision unit 14, and a control information set unit 54.

The parameter calculator 13 obtains a complexity index value from the input image S101 to be transformed, and calculates a quantization scale modification parameter M using a complexity mean value obtained from the complexity index value and the statistical characteristics of the complexity index value. Further, the parameter calculator 13 calculates a weighting parameter w from the complexity index value, and outputs this parameter w and the quantization scale modification parameter M toward the quantization scale decision unit 14. The control information set unit 54 sets a target data quantity and quantization characteristic information, and outputs these to the quantization scale decision unit 14. The quantization scale decision unit 14 decides a modified quantization scale using the weighting parameter w and the quantization scale modification parameter M output from the parameter calculator 13, and the quantization characteristic information output from the control information set unit 54. The subtracter 1, image transformer 2, quantizer 3, variable-length encoder 4, inverse quantizer 5, inverse image transformer 6, adder 7, and image storage unit 8 are identical to those already described for the prior art and, therefore, do not require repeated description.

A description is given of the operation of the image coding apparatus so constructed, with respect to image coding and rate control. The apparatus according to this third embodiment performs [A. Coding], [B. Local Decoding], and [C. Rate Control], like the prior art apparatus. Since [A. Coding] and [B. Local Decoding] according to this third embodiment are identical to those already described for the prior art, only [C. Rate Control] will be described hereinafter.

[C. Rate Control]

In the apparatus according to the first embodiment, the parameter calculator 9 obtains the complexity index value of the input image S101 to be transformed and, on the basis of the complexity index value, the calculator 9 obtains the quantization scale modification parameter, the image significance decision result, and the significant image area ratio and outputs these to the quantization scale decision unit 10. In contrast with the first embodiment, in the apparatus according to the third embodiment, the parameter calculator 13 uses, for calculation of the quantization scale modification parameter, not only the complexity index value and the complexity index mean value but also the statistical characteristics of the complexity index value. The parameter calculator 13 calculates the quantization scale modification parameter M as in formula (9).

$$M = \frac{A \times va + va\_mean}{va + A \times va\_mean} \quad (9)$$

where modulation parameter A is decided on the basis of the statistical characteristics of the complexity index value. The modulation parameter A on the basis of the statistical characteristics of the complexity index value is obtained as follows. Initially, the ratio K of complexity index values exceeding the complexity index mean value is obtained. Using the ratio K, the modulation parameter A can be obtained as shown in formula (10).

$$A = a \times K + b \quad (10)$$

where a and b are constants which are set according to the coding mode, such as intra-frame coding or inter-frame coding.

In this third embodiment, the parameter calculator 13 obtains the weighting parameter w according formula 11a or 11b, and outputs this to the quantization scale decision unit 14.

$$w = c \times va + d \quad (11a)$$
$$(va < e)$$

$$w = 1 \quad (11b)$$
$$(va \geq e)$$

where c, d and e are constants which are set according to the coding mode.

The quantization scale decision unit 14 obtains the buffer fullness according to formula (12), instead of formula (6a) or (6b) according to the first embodiment.

$$D(j) = D(j-1) + w \times \left(Gm - \frac{Tp}{MBa}\right) \quad (12)$$

That is, in the apparatus according to the first embodiment, one of the completely different processes shown by formulae (6a) and (6b) is selected according to a threshold value, so that an appropriate threshold value must be set. In contrast with the first embodiment, in the apparatus according to the third embodiment, with respect to the weighting parameter obtained by the parameter calculator 13, its boundary is smoothed as shown in formulae (11a) and (11b). Since the quantization scale decision unit 14 receives this weighting parameter and performs the calculation of formula (12) in place of formula (6a) or (6b), more stable result can be obtained also in the vicinity of the boundary value.

Meanwhile, the control information set unit 54 sets the target data quantity Tp as in the first embodiment, and sets the quantization characteristic information which is used to modify the calculation for obtaining the quantization scale from the buffer fullness according to formula (7) by the quantization scale decision unit 14, and outputs these to the quantization scale decision unit 14. Although in formula (7) the quantization scale is obtained linearly with respect to the buffer fullness, actually it is necessary to change the characteristics according to the coding rate and the complexity index of image. So, to set the conversion characteristics from the buffer fullness to the quantization scale by the control information set unit 54 enables control well adapted to the coding rate.

As described above, according to the third embodiment of the invention, the image coding apparatus is provided with the parameter calculator 13 wherein a complexity index value which is the total of variances of the respective blocks is obtained for each input image S101 which is a difference between the input image S100 and the reference image S108. When the complexity index value is used for modification of the quantization scale for rate control, the quantization scale modification parameter is calculated with regard to the statistical characteristics of the complexity index value. Further, the conversion characteristics used when the quantization scale decision unit 14 calculates the quantization scale from the buffer fullness are obtained from the quantization characteristic information set by the control information set unit 54. Therefore, it is possible to perform coding well adapted to the characteristics of the input image, resulting in improved image quality and highly precise rate control.

Although in this third embodiment the modulation parameter is obtained according to formula (10), another arithmetic expression may be employed as long as it satisfies the condition that the modulation parameter value is decreased when some of complexity index values within a frame are larger than the others while it is increased when the complexity index values are smaller than the others.

Furthermore, although in this third embodiment the weighting parameter is obtained according to formula (11), another arithmetic expression may be employed as long as a weighting parameter in proportion to the complexity index value can be obtained.

[Embodiment 4]

An image coding apparatus according to a fourth embodiment of the invention performs modification of quantization scale using the statistical characteristics of complexity index values, and it uses characteristic values obtained not from the previous frame but from the frame being the coding target, i.e., being currently processed.

Figure 4:
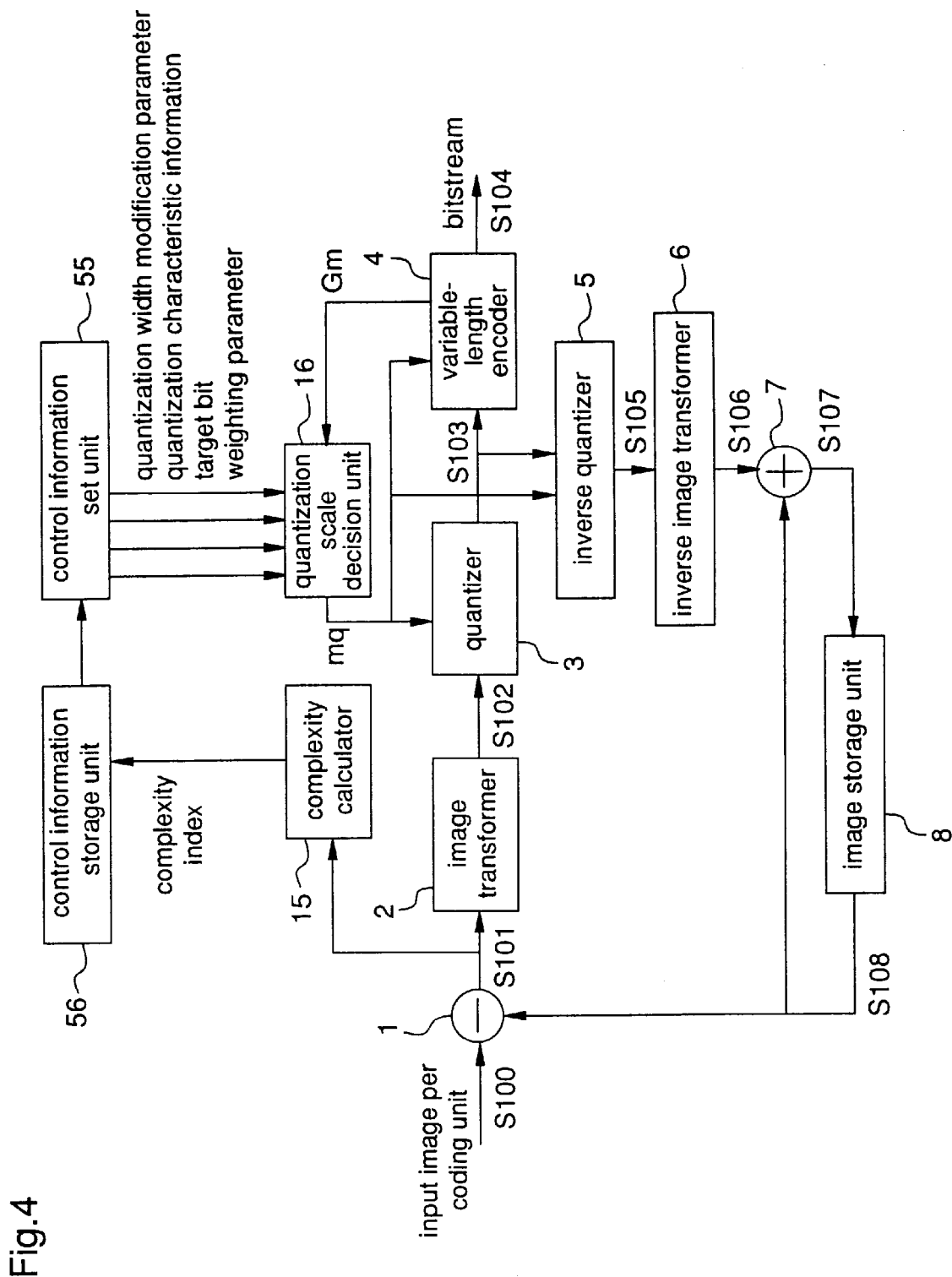
FIG. 4 is a block diagram illustrating an image coding apparatus according to a fourth embodiment of the present invention.

FIG. 4 is a block diagram illustrating an image coding apparatus according to a fourth embodiment of the invention. With reference to FIG. 4, the apparatus comprises a subtracter 1, an image transformer 2, a quantizer 3, a variable-length encoder 4, an inverse quantizer 5, an inverse image transformer 6, an adder 7, an image storage unit 8, a complexity calculator 15, a quantization scale decision unit 16, a control information set unit 55, and a control information storage unit 56.

The complexity calculator 15 obtains a complexity index value from an input image S101 to be transformed, and outputs this to the control information storage unit 56. The control information storage unit 56 is identical to that according to the second embodiment. The control information set unit 55 sets a target data quantity, quantization characteristic information, and a weighting parameter and a quantization scale modification parameter on the basis of the information stored in the control information storage unit 56, and outputs these to the quantization scale decision unit 16. The quantization scale decision unit 16 uses, for decision of a modified quantization scale mq, the weighting parameter, the quantization scale modification parameter, and the quantization characteristic information which are output from the control information set unit 55. The subtracter 1, image transformer 2, quantizer 3, variable-length encoder 4, inverse quantizer 5, inverse image transformer 6, adder 7, and image storage unit 8 are identical to those already described for the prior art and, therefore, do not require repeated description.

A description is given of the operation of the image coding apparatus so constructed, with respect to image coding and rate control. The apparatus according to this fourth embodiment performs [A. Coding], [B. Local Decoding], and [C. Rate Control], like the prior art apparatus. Since [A. Coding] and [B. Local Decoding] according to this fourth embodiment are identical to those already described for the prior art, only [C. Rate Control] will be described hereinafter.

[C. Rate Control]

The complexity calculator 15 obtains a complexity index value from the input image S101 to be transformed like the parameter calculator 9 according to the first embodiment, and outputs this to the control information storage unit 56. The control information storage unit 56 stores the complexity index value.

The control information set unit 55 outputs a target data quantity Tp, which is a target value of output data quantity of coding result, to the quantization scale decision unit 16 in the same manner as described for the first embodiment. In addition, the control information set unit 55 fetches the complexity index value from the control information storage unit 56 and, on the basis of the complexity index value, it obtains a complexity mean value and a modulation parameter according to the statistical characteristics of the complexity index value, and calculates a quantization scale modification parameter from the mean value and the modulation parameter. The quantization scale modification parameter is input to the quantization scale decision unit 16. Further, the control information set unit 55 obtains a weighting parameter from the complexity index value in the same manner as mentioned for the third embodiment, and outputs this to the quantization scale decision unit 16.

Furthermore, the control information set unit 55 sets the quantization characteristic information which is used for modification of calculation performed to obtain the quantization scale from the buffer fullness by the quantization scale decision unit 16 according to formula (7), and outputs this information to the quantization scale decision unit 16.

The quantization scale decision unit 16 performs the calculation of formula (12), not formulae (6a) and (6b), and performs the calculation of formula (7) according to the quantization characteristic information. Thereafter, in the calculation of formula (8), it obtains a modified quantization scale using the quantization scale modification parameter.

Also in the apparatus according to this fourth embodiment, as described for the second embodiment, it is possible to perform modification according to, not the characteristic values of the previous frame, but the characteristic values of the target frame currently being processed, by employing the two-pass coding or the one-pass coding with an appropriate delay.

As described above, according to the fourth embodiment of the invention, the image coding apparatus is provided with the complexity calculator 15 and the control information storage unit 56. The complexity calculator 15 obtains the complexity index value from the input image S101 to be transformed, and the control information storage unit 56 stores the complexity index value. The control information set unit 55 obtains, from the stored complexity index value, the complexity mean value and the modulation parameter based on the statistical characteristics of the complexity index value and, according to the mean value and the parameter, the control information set unit 55 calculates the quantization scale modification parameter and outputs this to the quantization scale decision unit 16. Further, the control information set unit 55 sets the quantization characteristic information which is used for calculation of the modified quantization scale by the quantization scale decision unit 16, and outputs this to the quantization scale decision unit 16. Therefore, coding well adapted to characteristics of input image is possible, resulting in improved image quality and improved precision in rate control.

Although the first to fourth embodiments are described on inter-frame coding, these embodiments may be applied to intra-frame coding with the same effects as mentioned above.

Further, the image coding apparatus according to any of the first to fourth embodiments is applicable to object coding by appropriately processing an image before it is input to the coding apparatus. Object coding is a coding method in which components constituting an image, i.e., background, person, moving object and the like, are treated as independent objects, and coding is performed object by object. Since coding is carried out object by object, edition, such as replacement of a specific object, can be performed easily.

In the image coding apparatus according to any of the first to fourth embodiments, as preprocessing, digital image data is stored in a frame memory. At this time, a portion (data) of object being the coding target is stored as it is while a portion (data) not being the coding target is transformed so that its variance becomes 0 and stored. Thereby, the stored data can be subjected to coding similar to that described above using the image coding apparatus according to any of the aforementioned embodiments, whereby highly-precise rate control is executed, resulting in improved image quality of coding result.

[Embodiment 5]

Figure 5:
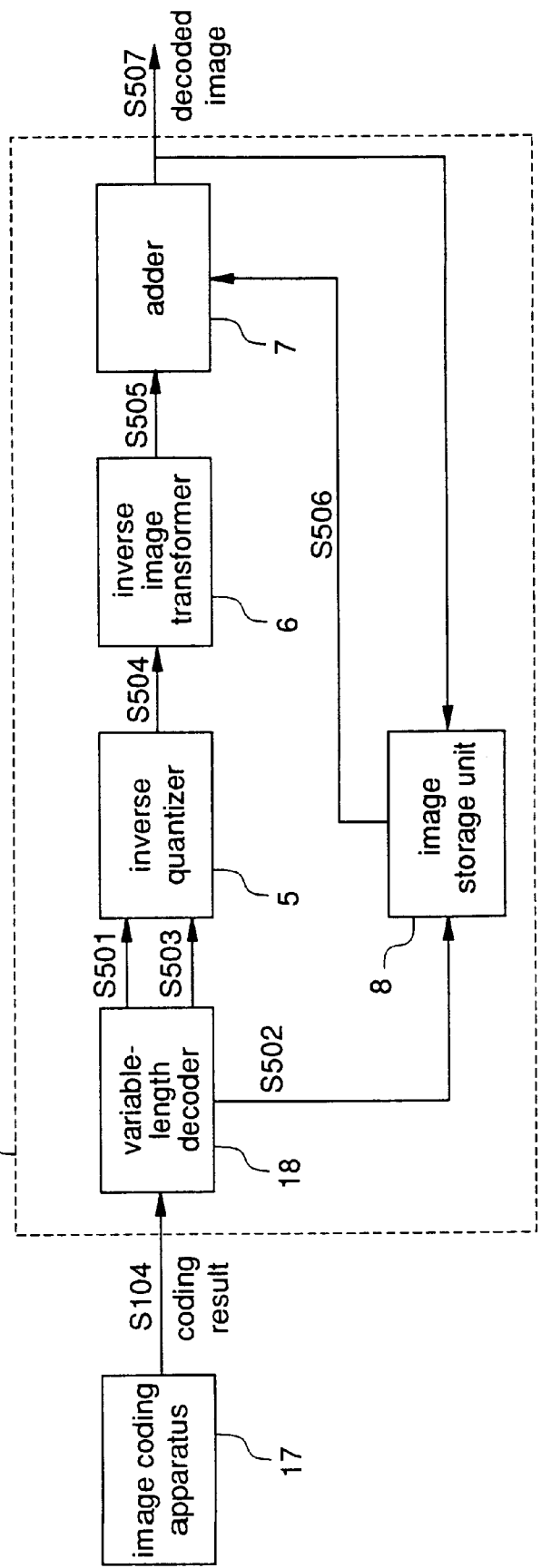
FIG. 5 is a block diagram illustrating an image decoding apparatus according to a fifth embodiment of the present invention.

FIG. 5 is a block diagram illustrating an image decoding apparatus according to a fifth embodiment of the invention. In the figure, an image coding apparatus 17 is identical to the image coding apparatus according to the first embodiment. An image decoding apparatus 19 according to this fifth embodiment receives coded image data S104 output from the coding apparatus 17, and performs decoding of the coded image data S104.

A variable-length decoder 18 receives the coded image data (coding result) S104, and performs variable-length decoding to generate a transformed and quantized image S501, reference image information S502, and a modified quantization scale S503. An inverse quantizer 5 receives the transformed and quantized image and the modified quantization scale, and generates an inversely quantized image. An inverse image transformer 6 receives the inversely quantized image and generates an inversely transformed image by prescribed inverse transformation. An adder 7 adds a reference image and the inversely transformed image to generate a locally decoded image. An image storage unit 8 stores the locally decoded image for a prescribed period of time, and generates the reference image on the basis of the reference image information.

A description is given of the operation of the image decoding apparatus so constructed, with respect to coded image data processing.

The coding result S104 output from the image coding apparatus 17 is input to the variable-length decoder 18, and the variable-length decoder 18 generates the transformed and quantized image S501, the reference image information S502, and the modified quantization scale S503. The transformed and quantized image S501 and the modified quantization scale S503 are output toward the inverse quantizer 5 while the reference image information S502 is output toward the image storage unit 8. The inverse quantizer 5 inversely quantizes the transformed and quantized image S501 on the basis of the modified quantization scale to generate an inversely quantized image S504, and outputs this to the inverse image transformer 6. The inverse image transformer 6 inversely transforms the inversely quantized image S504 to generate an inversely transformed image S505, and outputs this to the adder 7. Meanwhile, the image storage unit 8 generates the reference image S506 on the basis of the reference image information S502, and outputs this to the adder 7. The adder 7 adds the inversely transformed image S505 and the reference image S506 to generate a decoded image S507. The decoded image S507 is output from the image decoding apparatus 19 and, on the other hand, it is input to the image storage unit 8 and stored for a prescribed period of time.

Although the image decoding apparatus 19 decodes coded image data processed in the image coding apparatus according to the first embodiment, it can decode coded image data processed in any of the coding apparatuses according to the second to fourth embodiments, in the same manner as described above.

As described above, since the image decoding apparatus according to the fifth embodiment performs decoding on the basis of the modified quantization scale generated from the input coded image S104, a high-quality decoded image can be obtained. Furthermore, when the image decoding apparatus according to this fifth embodiment is combined with the image coding apparatus according to any of the first to fourth embodiment, the quality of the coded image can be checked speedily, so that this combination can be employed when experimentally setting the arithmetical expressions and coefficients in the image coding apparatus according to any of the first to fourth embodiments.

Although the image decoding apparatus according to this fifth embodiment processes coded data obtained by inter-frame coding in the image coding apparatus, it can process coded data processed by intra-frame coding with the same effects as mentioned above.

[Embodiment 6]

Figure 6:
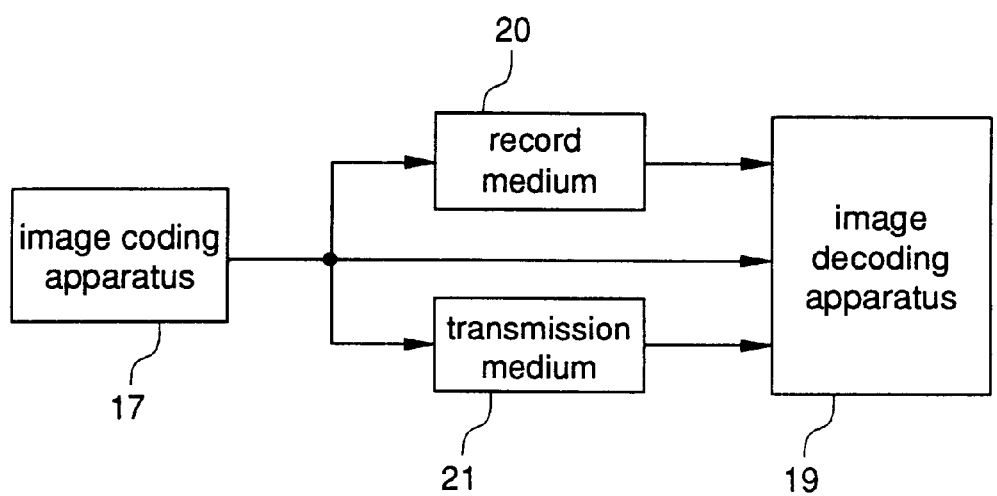
FIG. 6 is a block diagram for explaining a coded image recording medium and a coded image transmitting medium according to a sixth embodiment of the present invention.
Figure 7:
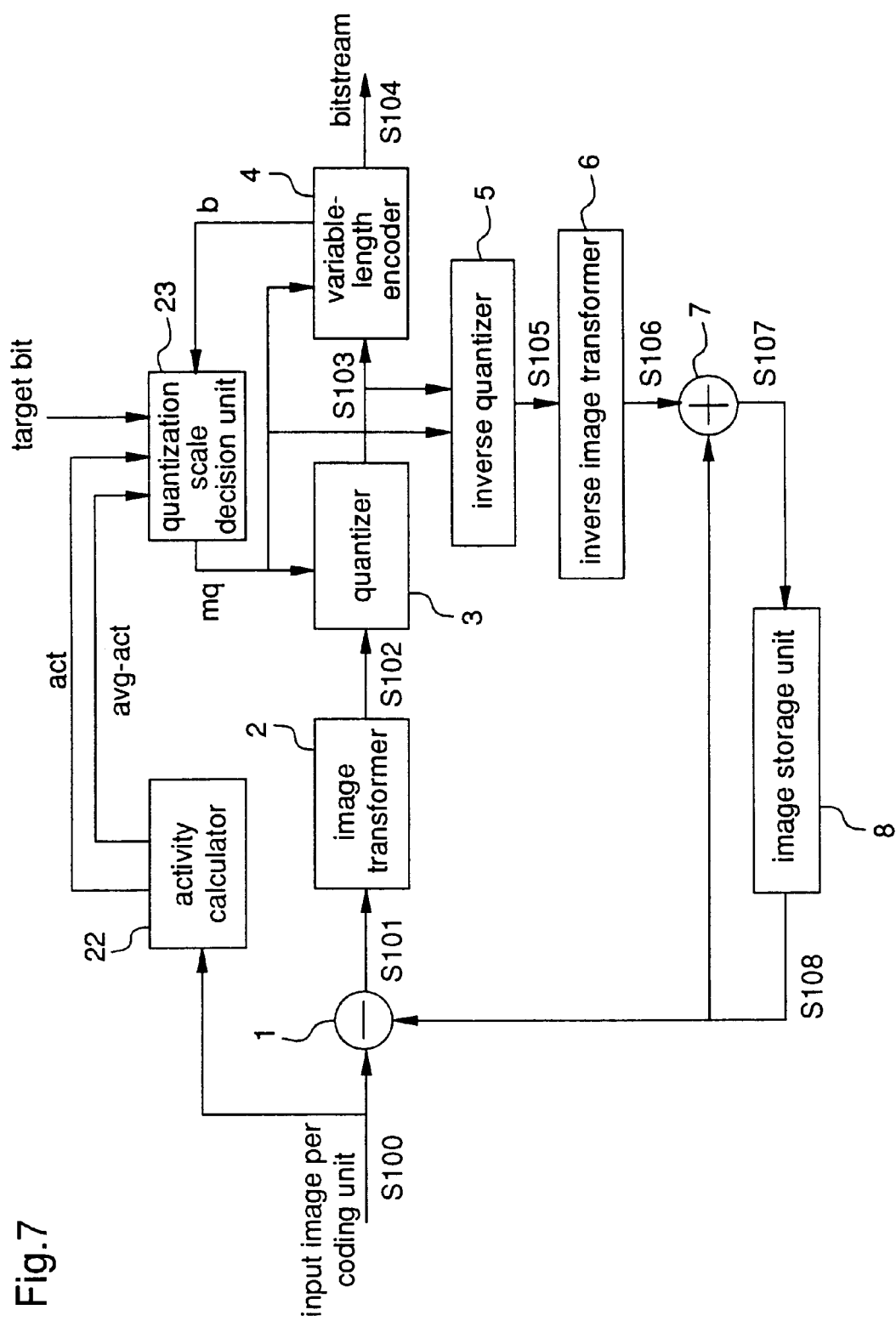
FIG. 7 is a block diagram illustrating an image coding apparatus according to the prior art.
Figure 8:
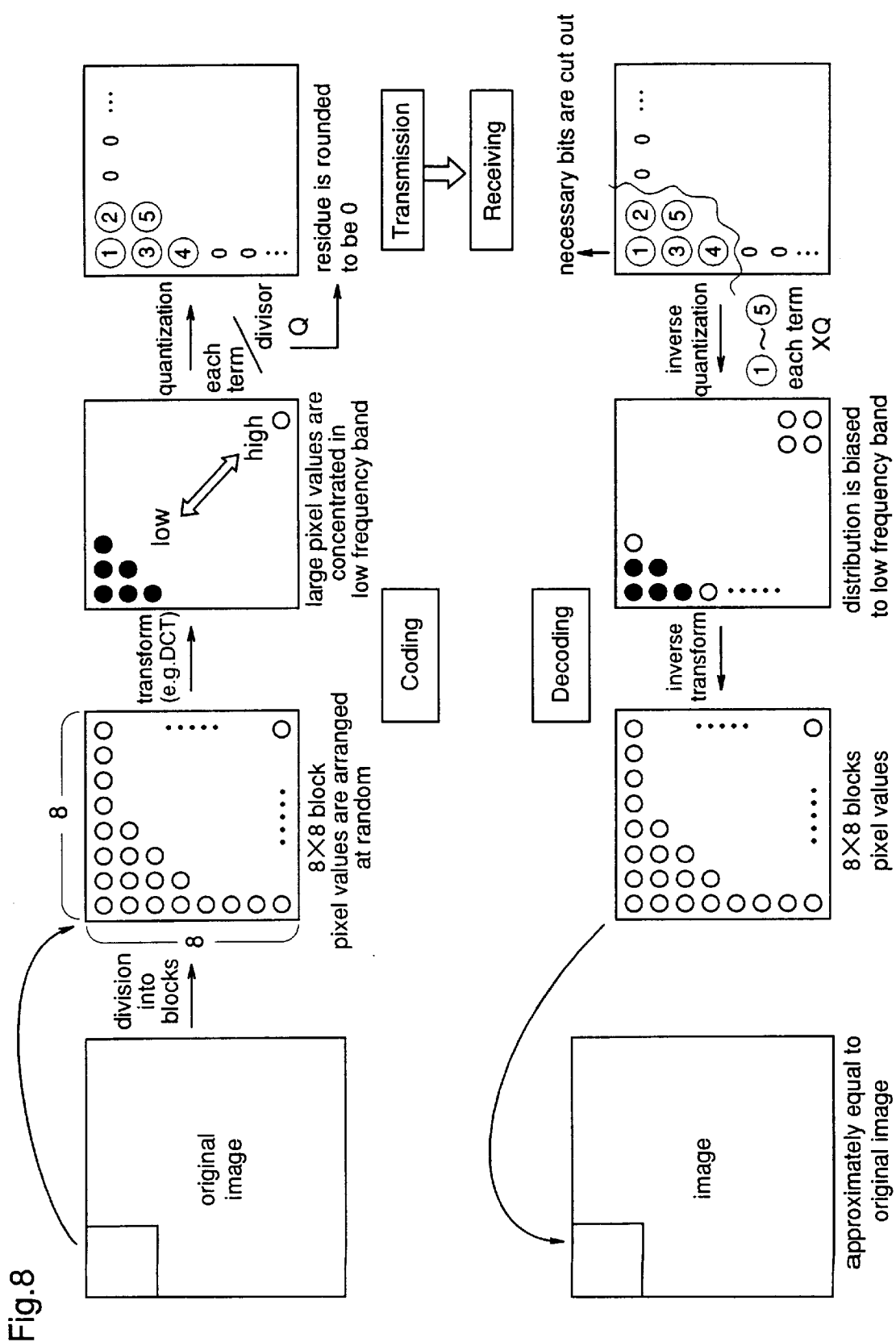
FIG. 8 is a diagram for explaining image coding and decoding.
Figure 9:
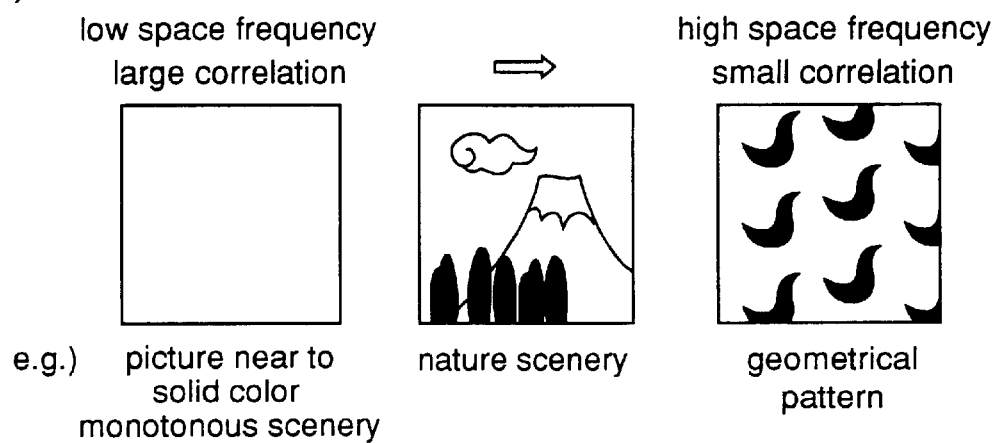
FIGS. 9(*a*) and 9(*b*) are diagrams for explaining intra-frame coding and inter-frame coding, respectively.
Figure 9:
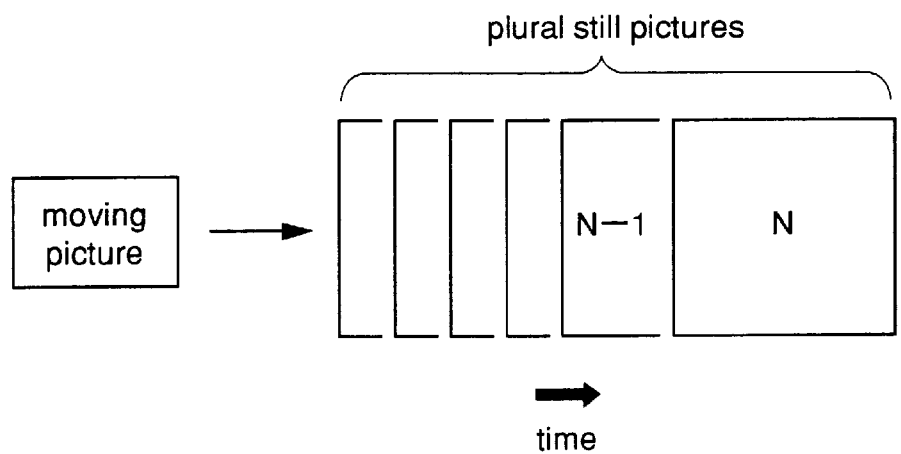

FIG. 6 is a block diagram for explaining relations between an image recording medium 20, an image transmitting medium 21, an image coding apparatus 17, and an image decoding apparatus.

The image coding apparatus 17 is identical to the image coding apparatus according to the first embodiment, and capable of performing satisfactory rate control and outputting a coded image of improved image quality. The image decoding apparatus 19 is identical to the image decoding apparatus according to the fifth embodiment; and capable of providing a decoded image of improved image quality by decoding the above-mentioned coded image.

The image recording medium 20 according to this sixth embodiment is implemented by a magnetic recording medium, such as compact disk, optical disk, optical magnetic disk, or hard disk, and it can retain coded image data obtained by the image coding apparatus 17 for an arbitrary period of time. A high quality decoded image can be obtained by reading and decoding the recorded data from the medium 20 at an arbitrary time in an arbitrary place.

The image transmitting medium 21 according to this sixth embodiment is implemented by network, cable, radio communication or the like. Even when decoding of coded image data is desired in a distant place, the medium 21 can speedily transmit the image data to the place, whereby high quality decoded image can be obtained.

As described above, according to the sixth embodiment of the invention, since the coded image obtained in the image coding apparatus according to any of the first to fourth embodiments is migrated using the recording medium 20 or the transmitting medium 21, a decoded image with improved image quality can be obtained even in an independent decoding apparatus, exceeding the temporal and spatial restrictions.

What is claimed is:

1. An image coding apparatus that receives an input image per coding unit, which is obtained by dividing an original digital image into coding units, and codes the input image to obtain coded data, said apparatus comprising:

subtraction means for providing a difference image between the input image per coding unit and a reference image generated from a coded image which has already been coded;

image transform means for receiving, as an input image to be transformed, one of the input image per coding unit and the difference image, and performing a prescribed transformation process to the input image to be transformed, thereby to obtain a transformed image;

quantization means for quantizing the transformed image by one of a prescribed quantization scale and a modified quantization scale which is given from a quantization scale decision means, thereby to obtain transformed and quantized coefficients;

coding means for coding the transformed and quantized coefficients to obtain coded data, and outputting the coded data;

local characteristic value calculation means for obtaining a complexity index value from the input image to be transformed and, using the complexity index value, calculating local characteristic values which are used for modification of the prescribed quantization scale;

control information set means for setting control information which is used for modification of the prescribed quantization scale; and quantization scale decision means for modifying the prescribed quantization scale using the quantity of the coded data output from the coding means, the local characteristic values calculated by the local characteristic value calculation means, and the control information set by the control information set means, and outputting the modified quantization scale toward the quantization means.

2. The image coding apparatus of claim 1 wherein:

the local characteristic value calculation means is a parameter calculation means which provides, as the local characteristic values, quantization scale modification parameters calculated on the basis of the complexity index values, an image significance decision result obtained as a result of comparison of the complexity index value of each input image to be transformed with a prescribed value, and a significant image area ratio showing the number of the input images to be transformed whose image significance decision results are "significant", and the parameter calculation means outputs the quantization scale modification parameters, the image significance decision result, and the significant image area ratio toward the quantization scale decision means;

the control information set means sets a target value of the quantity of the coded data as a target data quantity, and outputs the target data quantity toward the quantization scale decision means; and the quantization scale decision means decides the modified quantization scale, on the basis of the target data quantity output from the control information set means, and the quantization scale parameters, the significant image area ratio and the image significance decision result which are output from the parameter calculation means.

3. The image coding apparatus of claim 1 further comprising control information storage means for storing control information used for modification of the prescribed quantization scale, wherein:

the local characteristic value calculation means is a complexity calculation means which provides a complexity mean value being an average of the complexity index values, an image significance decision result being a result of comparison of the complexity index value of each input image to be transformed with a prescribed value, and a significant image area ratio showing the number of the input images to be transformed whose image significance decision results are "significant", and the complexity calculation means outputs the complexity mean value and the significant image area ratio toward the control information storage means as control information while outputs the complexity index values toward the quantization scale decision means;

the control information set means sets a target value of the quantity of the coded data as a target data quantity, sets a complexity mean value and a significant image area ratio on the basis of the control information stored in the control information storage means, and outputs the target data quantity, the complexity mean value, and the significant image area ratio toward the quantization scale decision means; and the quantization scale decision means decides the modified quantization scale, on the basis of quantization scale modification parameters calculated from the complexity index values, and the complexity mean value, the significant image area ratio and the target data quantity which are output from the control information set means.

4. The image coding apparatus of claim 1 wherein:

the local characteristic value calculation means is a parameter calculation means which provides a complexity mean value being an average of the complexity index values with respect to the original image, modulation parameters obtained from the statistical characteristics of the complexity index values, and weighting parameters obtained from the complexity index values using a prescribed function, calculates quantization scale modification parameters from the complexity index values, the complexity index mean value, and the modulation parameters, and outputs the weighting parameters and the quantization scale modification parameters toward the quantization scale decision means;

the control information set means sets a target value of the quantity of the coded data as a target data quantity, sets quantization characteristic information showing quantization characteristics for decision of the quantization scale, and outputs the target data quantity and the quantization characteristic information toward the quantization scale decision means; and the quantization scale decision means decides the modified quantization scale, on the basis of the quantization scale modification parameters output from the parameter calculation means, and the quantization characteristic information and the target data quantity which are output from the control information set means.

5. The image coding apparatus of claim 1 further comprising control information storage means for storing control information used for modification of the prescribed quantization scale, wherein:

the local characteristic value calculation means is a complexity calculation means which outputs the complexity index values as the control information to the control information storage means;

the control information set means obtains a complexity mean value as an average of the complexity index values with respect to the original image, and modulation parameters from the statistical characteristics of the complexity index values, on the basis of the complexity index values stored in the control information storage means, calculates quantization scale modification parameters from the complexity index values, the complexity index mean value, and the modulation parameters, and obtains weighting parameters from the complexity index values using a prescribed function;

the control information set means sets a target value of the quantity of the coded data as a target data quantity, and sets quantization characteristic information showing characteristics of quantization for decision of the quantization scale;

the control information set means outputs the quantization scale modification parameters, the weighting parameters, the target data quantity, and the quantization characteristic information toward the quantization scale decision means; and the quantization scale decision means decides the modified quantization scale, on the basis of the quantization scale modification parameters, the weighting parameters, the quantization characteristic information, and the target data quantity which are output from the control information set means.

6. A recording medium containing coded image data, wherein the coded image data are coded data output from the image coding apparatus according to claim 1.

7. An image decoding apparatus for decoding coded image data to obtain an image, comprising:

variable-length decoding means for decoding coded image data to generate a transformed and quantized image, reference image information, and a modified quantization scale;

inverse quantization means for performing inverse quantization to the transformed and quantized image using the modified quantization scale, thereby to obtain an inversely quantized image;

inverse image transform means for performing inverse transform to the inversely quantized image, thereby to obtain an inversely transformed image;

addition means for generating a decoded image using the inversely transformed image and a reference image which is obtained from image storage means described later; and image storage means for storing the decoded image for a prescribed period of time, generating a reference image from the stored decoded image and the reference image information output from the variable-length decoding means, and outputting the reference image to the addition means;

wherein the coded image data is obtained from an image coding apparatus that receives an input image per coding unit, which is obtained by dividing an original digital image into coding units, and codes the input image to obtain coded data, said apparatus comprising subtraction means for providing a difference image between the input image per coding unit and a reference image generated from a coded image which has already been coded;

image transform means for receiving, as an input image to be transformed, one of the input image per coding unit and the difference image, and performing a prescribed transformation process to the input image to be transformed, thereby to obtain a transformed image;

quantization means for quantizing the transformed image by one of a prescribed quantization scale and a modified quantization scale which is given from a quantization scale decision means, thereby to obtain transformed and quantized coefficients;

coding means for coding the transformed and quantized coefficients to obtain coded data, and outputting the coded data, local characteristic value calculation means for obtaining a complexity index value from the input image to be transformed and, using the complexity index value, calculating local characteristic values which are used for modification of the prescribed quantization scale;

control information set means for setting control information which is used for modification of the prescribed quantization scale; and quantization scale decision means for modifying the prescribed quantization scale using the quantity of the coded data output from the coding means, the local characteristic values calculated by the local characteristic value calculation means, and the control information set by the control information set means, and outputting the modified quantization scale toward the quantization means.

8. An image coding method wherein an input image per coding unit, which is obtained by dividing an original digital image into coding units, is coded to obtain coded data, said method comprising:

subtraction step of providing a difference image between the input image per coding unit and a reference image generated from a coded image which has already been coded;

image transform step of receiving, as an input image to be transformed, one of the input image per coding unit and the difference image, and performing a prescribed transformation process to the input image to be transformed, thereby to obtain a transformed image;

quantization step of quantizing the transformed image by one of a prescribed quantization scale and a modified quantization scale which is decided in a quantization scale decision step, thereby to obtain transformed and quantized coefficients;

coding step of coding the transformed and quantized coefficients to generate coded data;

local characteristic value calculation step of obtaining a complexity index value from the input image to be transformed and, using the complexity index value, calculating local characteristic values which are used for modification of the prescribed quantization scale;

control information set step of setting control information which is used for modification of the prescribed quantization scale; and quantization scale decision step of modifying the prescribed quantization scale using the quantity of the coded data generated in the coding step, the local characteristic values calculated in the local characteristic value calculation step, and the control information set in the control information set step, thereby to decide a modified quantization scale.

9. The image coding method of claim 8 wherein:

the local characteristic value calculation step is a parameter calculation step in which quantization scale modification parameters are calculated on the basis of the complexity index values, an image significance decision result is obtained as a result of comparison of the complexity index value of each input image to be transformed with a prescribed value, and a significant image area ratio is obtained, which ratio shows the number of the input images to be transformed whose image significance decision results are "significant";

in the control information set step, a target value of the quantity of the coded data is set as a target data quantity; and in the quantization scale decision step, the modified quantization scale is decided on the basis of the target data quantity set in the control information set step, and the quantization scale parameters, the significant image area ratio and the image significance decision result which are calculated in the parameter calculation step.

10. The image coding method of claim 8 wherein:

the local characteristic value calculation step is a complexity calculation step in which a complexity mean value is obtained as an average of the complexity index values, an image significance decision result is obtained as a result of comparison of the complexity index value of each input image to be transformed with a prescribed value, and a significant image area ratio is obtained, which ratio shows the number of the input images to be transformed whose image significance decision results are "significant";

in the control information set step, a target value of the quantity of the coded data is set as a target data quantity, and a complexity mean value and a significant image area ratio are set on the basis of control information including the complexity mean value and the significant image area ratio; and in the quantization scale decision step, the modified quantization scale is decided on the basis of quantization scale modification parameters calculated from the complexity index values, and the complexity mean value, the significant image area ratio and the target data quantity which are set in the control information set step.

11. The image coding method of claim 8 wherein:

the local characteristic value calculation step is a parameter calculation step in which a complexity mean value is obtained as an average of the complexity index values with respect to the original image, modulation parameters are obtained from the statistical characteristics of the complexity index values, weighting parameters are obtained from the complexity index values using a prescribed function, quantization scale modification parameters are calculated using the complexity index values, the complexity index mean value, and the modulation parameters, and the weighting parameters and the quantization scale modification parameters are generated so that these parameters can be used in the quantization scale decision step;

in the control information set step, a target value of the quantity of the coded data is set as a target data quantity, quantization characteristic information showing quantization characteristics for decision of the quantization scale is set, and the target data quantity and the quantization characteristic information are output so that these can be used in the quantization scale decision step; and in the quantization scale decision step, the modified quantization scale is decided on the basis of the quantization scale modification parameters calculated in the parameter calculation step, and the quantization characteristic information and the target data quantity which are set in the control information set step.

12. The image coding method of claim 8 wherein:

in the control information set step, on the basis of the complexity index values being the control information, a complexity mean value is obtained as an average of the complexity index values with respect to the original image, modulation parameters are obtained from the statistical characteristics of the complexity index values, quantization scale modification parameters are calculated using the complexity index values, the complexity mean value, and the modulation parameters, weighting parameters are obtained from the complexity index values using a prescribed function, a target value of the quantity of the coded data is set as a target data quantity, and quantization characteristic information showing characteristics of quantization for decision of the modified quantization scale is set; and in the quantization scale decision step, the modified quantization scale is decided on the basis of the quantization scale modification parameters, the weighting parameters, the quantization characteristic information, and the target data quantity which are set in the control information set step.

13. An image decoding method for decoding coded image data to obtain an image, comprising:

variable-length decoding step of decoding coded image data to generate a transformed and quantized image, reference image information, and a modified quantization scale;

inverse quantization step of performing inverse quantization to the transformed and quantized image using the modified quantization scale, thereby to obtain an inversely quantized image;

inverse image transform step of performing inverse transform to the inversely quantized image, thereby to obtain an inversely transformed image;

addition step of generating a decoded image using the inversely transformed image and a reference image which is generated in an image storage step; and image storage step of storing the decoded image for a prescribed period of time, and generating a reference image from the stored decoded image and the reference image information generated in the variable-length decoding step;

wherein the coded data obtained by the image coding method according to claim 8 is processed as the coded image data.

14. A method for transmitting coded image data, wherein the coded image data are coded data processed in the image coding method according to claim 8.

15. A recording medium containing an image coding program for coding an input image per coding unit, which is obtained by dividing an original digital image into coding units, thereby to obtain coded data, said image coding program comprising:

subtraction step of providing a difference image between the input image per coding unit and a reference image generated from a coded image which has already been coded;

image transform step of receiving, as an input image to be transformed, one of the input image per coding unit and the difference image, and performing a prescribed transformation process to the input image to be transformed, thereby to obtain a transformed image;

quantization step of quantizing the transformed image by one of a prescribed quantization scale and a modified quantization scale which is decided in a quantization scale decision step, thereby to obtain transformed and quantized coefficients;

coding step of coding the transformed and quantized coefficients to generate coded data;

local characteristic value calculation step of obtaining a complexity index value from the input image to be transformed and, using the complexity index value, calculating local characteristic values which are used for modification of the prescribed quantization scale;

control information set step of setting control information which is used for modification of the prescribed quantization scale; and quantization scale decision step of modifying the prescribed quantization scale using the quantity of the coded data generated in the coding step, the local characteristic values calculated in the local characteristic value calculation step, and the control information set in the control information set step, thereby to decide a modified quantization scale.

16. The recording medium of claim 15 wherein:

the local characteristic value calculation step of the image coding program is a parameter calculation step in which quantization scale modification parameters are calculated on the basis of the complexity index values, an image significance decision result is obtained as a result of comparison of the complexity index value of each input image to be transformed with a prescribed value, and a significant image area ratio is obtained, which ratio shows the number of the input images to be transformed whose image significance decision results are "significant";

in the control information set step of the image coding program, a target value of the quantity of the coded data is set as a target data quantity; and in the quantization scale decision step of the image coding program, the modified quantization scale is decided on the basis of the target data quantity set in the control information set step, and the quantization scale parameters, the significant image area ratio and the image significance decision result which are calculated in the parameter calculation step.

17. The recording medium of claim 15 wherein:

the local characteristic value calculation step of the image coding program is a complexity calculation step in which a complexity mean value is obtained as an average of the complexity index values, an image significance decision result is obtained as a result of comparison of the complexity index value of each input image to be transformed with a prescribed value, and a significant image area ratio is obtained, which ratio shows the number of the input images to be transformed whose image significance decision results are "significant";

in the control information set step of the image coding program, a target value of the quantity of the coded data is set as a target data quantity, and a complexity mean value and a significant image area ratio are set on the basis of control information including the complexity mean value and the significant image area ratio; and in the quantization scale decision step of the image coding program, a modified quantization scale is decided on the basis of quantization scale modification parameters calculated from the complexity index values, and the complexity mean value, the significant image area ratio and the target data quantity which are set in the control information set step.

18. The recording medium of claim 15 wherein:

the local characteristic value calculation step of the image coding program is a parameter calculation step in which a complexity mean value is obtained as an average of the complexity index values with respect to the original image, modulation parameters are obtained from the statistical characteristics of the complexity index values, weighting parameters are obtained from the complexity index values using a prescribed function, quantization scale modification parameters are calculated using the complexity index values, the complexity index mean value, and the modulation parameters, and the weighting parameters and the quantization scale modification parameters are generated so that these parameters can be used in the quantization scale decision step;

in the control information set step of the image coding program, a target value of the quantity of the coded data is set as a target data quantity, quantization characteristic information showing quantization characteristics for decision of the modified quantization scale is set, and the target data quantity and the quantization characteristic information are output so that these can be used in the quantization scale decision step; and in the quantization scale decision step of the image coding program, the modified quantization scale is decided on the basis of the quantization scale modification parameters calculated in the parameter calculation step, and the quantization characteristic information and the target data quantity which are set in the control information set step.

19. The recording medium of claim 15 wherein:

in the control information set step of the image coding program, on the basis of the complexity index values being the control information, a complexity mean value is obtained as an average of the complexity index values with respect to the original image, modulation parameters are obtained from the statistical characteristics of the complexity index values, quantization scale modification parameters are calculated using the complexity index values, the complexity mean value, and the modulation parameters, weighting parameters are obtained from the complexity index values using a prescribed function, a target value of the quantity of the coded data is set as a target data quantity, and quantization characteristic information showing characteristics of quantization for decision of the modified quantization scale is set; and in the quantization scale decision step of the image coding program, the modified quantization scale is decided on the basis of the quantization scale modification parameters, the weighting parameters, the quantization characteristic information, and the target data quantity which are set in the control information set step.

20. A recording medium containing an image decoding program for decoding coded image data to obtain an image, said image decoding program comprising:

variable-length decoding step of decoding coded image data to generate a transformed and quantized image, reference image information, and a modified quantization scale;

inverse quantization step of performing inverse quantization to the transformed and quantized image using the modified quantization scale, thereby to obtain an inversely quantized image;

inverse image transform step of performing inverse transform to the inversely quantized image, thereby to obtain an inversely transformed image;

addition step of generating a decoded image using the inversely transformed image and a reference image which is generated in an image storage step; and image storage step of storing the decoded image for a prescribed period of time, and generating a reference image from the stored decoded image and the reference image information generated in the variable-length decoding step;

wherein the coded image data is obtained from an image coding method wherein an input image per coding unit, which is obtained by dividing an original digital image into coding units, is coded to obtain coded data, said method comprising subtraction step of providing a difference image between the input image per coding unit and a reference image generated from a coded image which has already been coded;

image transform step of receiving, as an input image to be transformed, one of the input image per coding unit and the difference image, and performing a prescribed transformation process to the input image to be transformed, thereby to obtain a transformed image;

quantization step of quantizing the transformed image by one of a prescribed quantization scale and a modified quantization scale which is decided in a quantization scale decision step, thereby to obtain transformed and quantized coefficients;

coding step of coding the transformed and quantized coefficients to generate coded data;

local characteristic value calculation step of obtaining a complexity index value from the input image to be transformed and, using the complexity index value, calculating local characteristic values which are used for modification of the prescribed quantization scale; and quantization scale decision step of modifying prescribed quantization scale using the quantity of the coded data generated in the coding step, the local characteristic values calculated in the local characteristic value calculation step, and the control information set in the control information set step, thereby to decide a modified quantization scale.

* * * * *